United States Patent [19]

White, Jr.

[11] Patent Number: 4,858,714
[45] Date of Patent: Aug. 22, 1989

[54] HYDROSTATIC STEERING DEVICE

[76] Inventor: Hollis N. White, Jr., 243 Pyle La., Hopkinsville, Ky. 42240

[21] Appl. No.: 170,675

[22] Filed: Mar. 17, 1988

Related U.S. Application Data

[63] Continuation of Ser. No. 812,443, Dec. 23, 1985, abandoned, which is a continuation-in-part of Ser. No. 763,001, Aug. 6, 1985, abandoned, which is a continuation-in-part of Ser. No. 567,429, Dec. 30, 1983, Pat. No. 4,552,519, which is a continuation-in-part of Ser. No. 439,058, Nov. 4, 1982, Pat. No. 4,494,916, which is a continuation-in-part of Ser. No. 381,946, May 26, 1982, abandoned, which is a continuation-in-part of Ser. No. 317,501, Nov. 2, 1981, Pat. No. 4,494,915, which is a continuation-in-part of Ser. No. 51,508, Jun. 25, 1979, abandoned, said Ser. No. 763,001, is a continuation-in-part of Ser. No. 603,994, Apr. 26, 1984, abandoned, which is a continuation of Ser. No. 390,328, Jun. 21, 1982, abandoned, which is a continuation-in-part of Ser. No. 360,832, Mar. 23, 1982, Pat. No. 4,454,744, which is a continuation-in-part of Ser. No. 113,400, Jan. 18, 1980, Pat. No. 4,357,133, which is a continuation of Ser. No. 910,075, May 26, 1978, abandoned.

[51] Int. Cl.⁴ .................... B62D 5/083; F15B 9/08; F16K 39/00
[52] U.S. Cl. .................... 180/148; 60/393; 91/375 R; 91/434; 137/625.23; 251/283
[58] Field of Search .............. 60/393; 91/375 R, 434; 180/132, 148; 137/625.21, 625.23, 625.24; 251/283

[56] References Cited

U.S. PATENT DOCUMENTS

| | | | |
|---|---|---|---|
| 3,254,674 | 6/1966 | Leask | 91/375 |
| 3,363,651 | 1/1968 | Boyd | 137/625.32 |
| 3,626,981 | 12/1971 | Bauer-Nilsen | 251/283 |
| 3,814,378 | 6/1974 | Wurzburger | 251/283 |
| 4,057,079 | 11/1977 | Taig | 91/375 R |
| 4,174,017 | 11/1979 | Morgan et al. | 180/132 |
| 4,217,932 | 8/1980 | Bacardit | 180/132 |
| 4,320,780 | 3/1982 | Bacardit | 91/434 |
| 4,421,191 | 12/1983 | Bertin et al. | 180/132 |
| 4,544,131 | 10/1985 | Adams | 91/375 R |
| 4,545,402 | 10/1985 | Lyons | 91/434 |

FOREIGN PATENT DOCUMENTS

| | | | |
|---|---|---|---|
| 57-55256 | 4/1982 | Japan | 180/132 |
| 2091181 | 7/1982 | United Kingdom | 180/132 |

*Primary Examiner*—John J. Vrablik
*Attorney, Agent, or Firm*—Woodling, Krost and Rust

[57] ABSTRACT

An improved hydrostatic steering mechanism is disclosed having a rotary valve with a radially displaced resilient feedback mechanism.

19 Claims, 15 Drawing Sheets

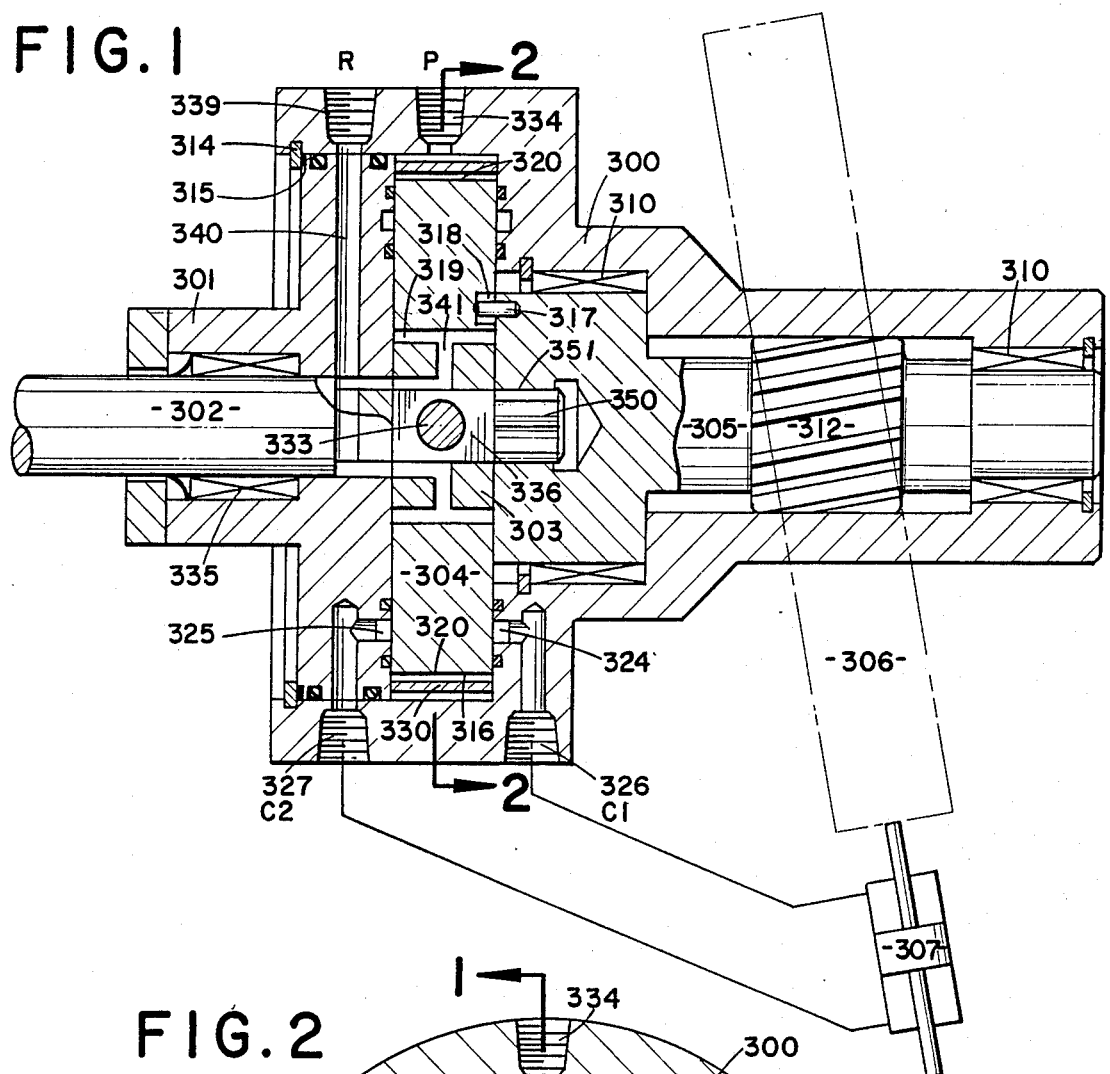
FIG. 1
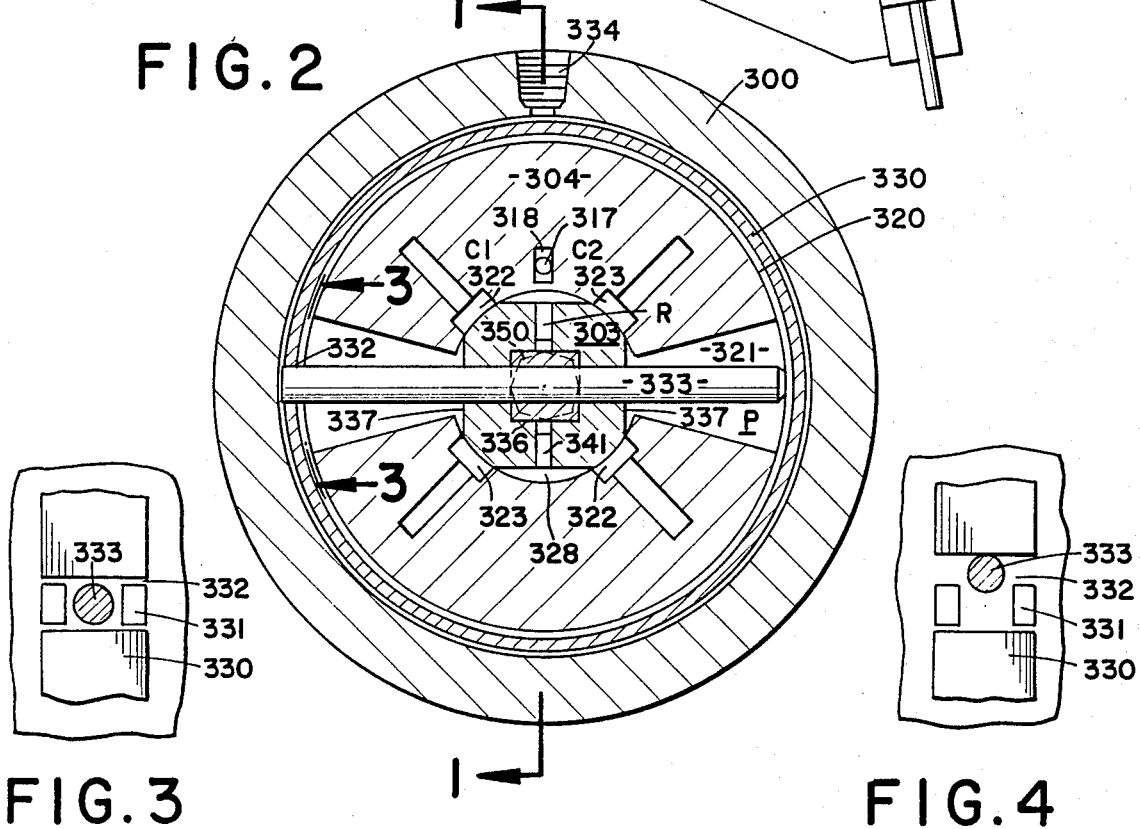
FIG. 2
FIG. 3
FIG. 4

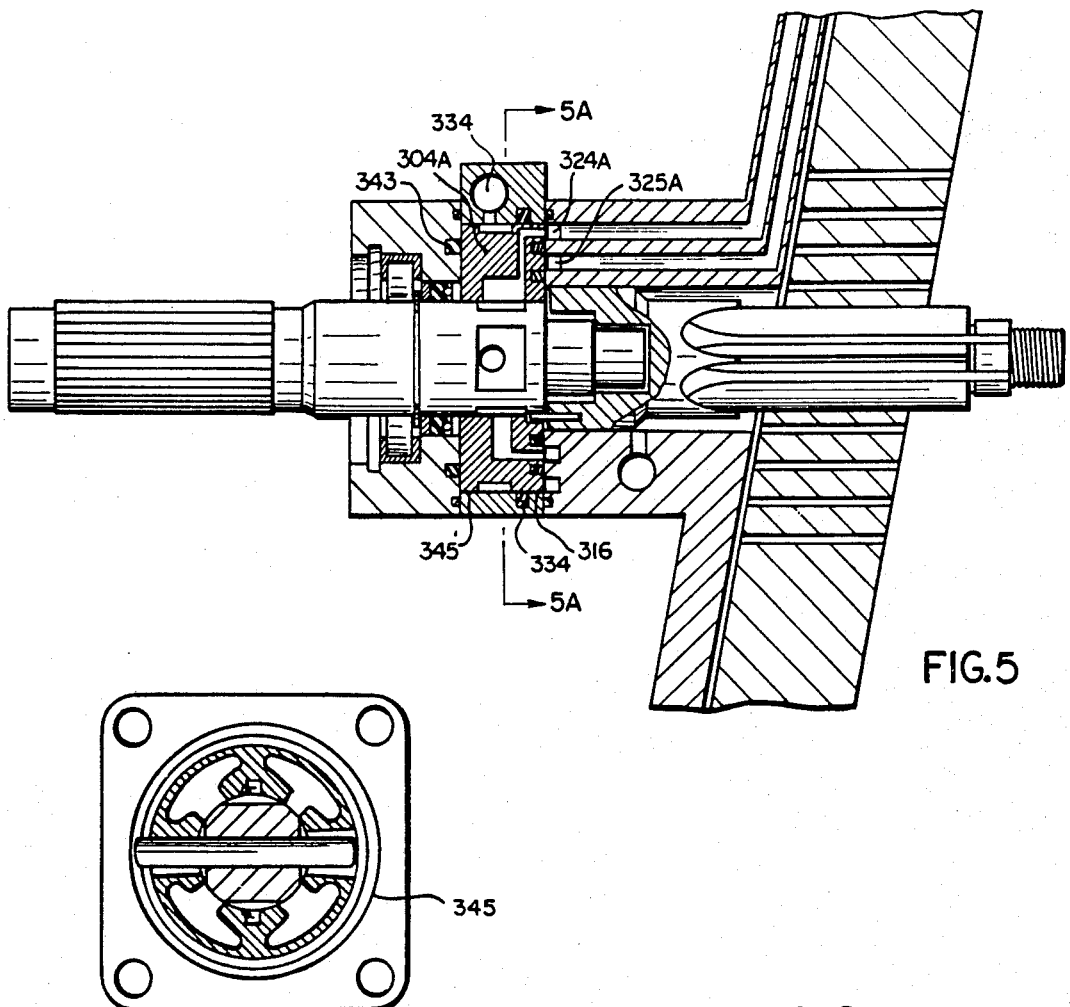
FIG.5
FIG.5A
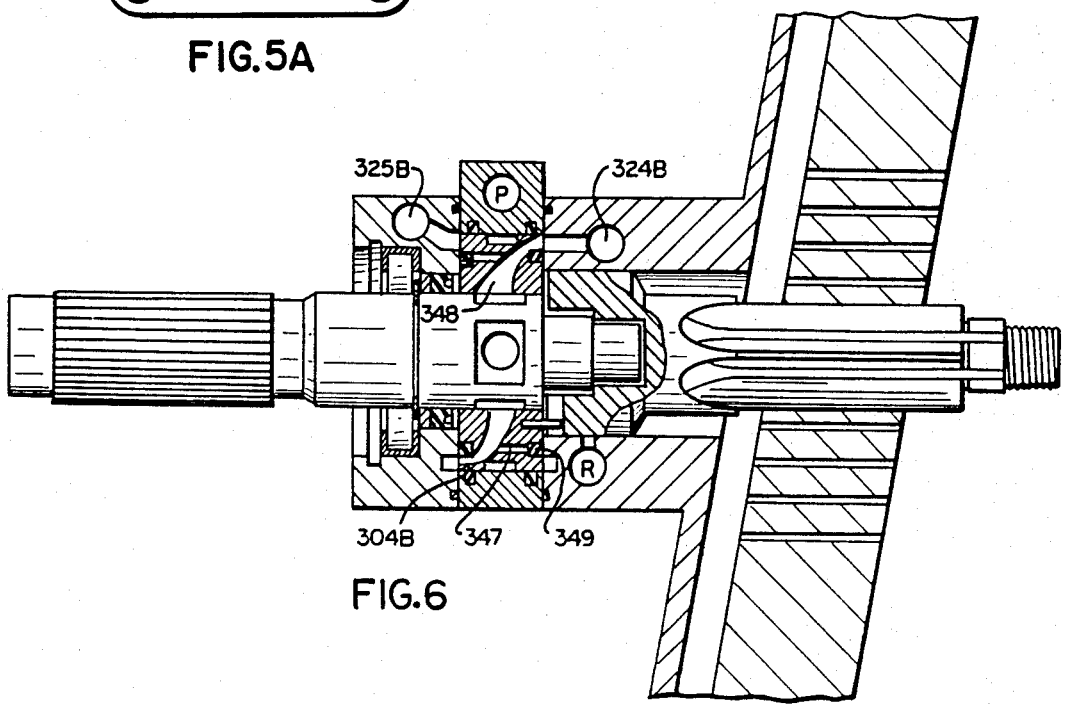
FIG.6

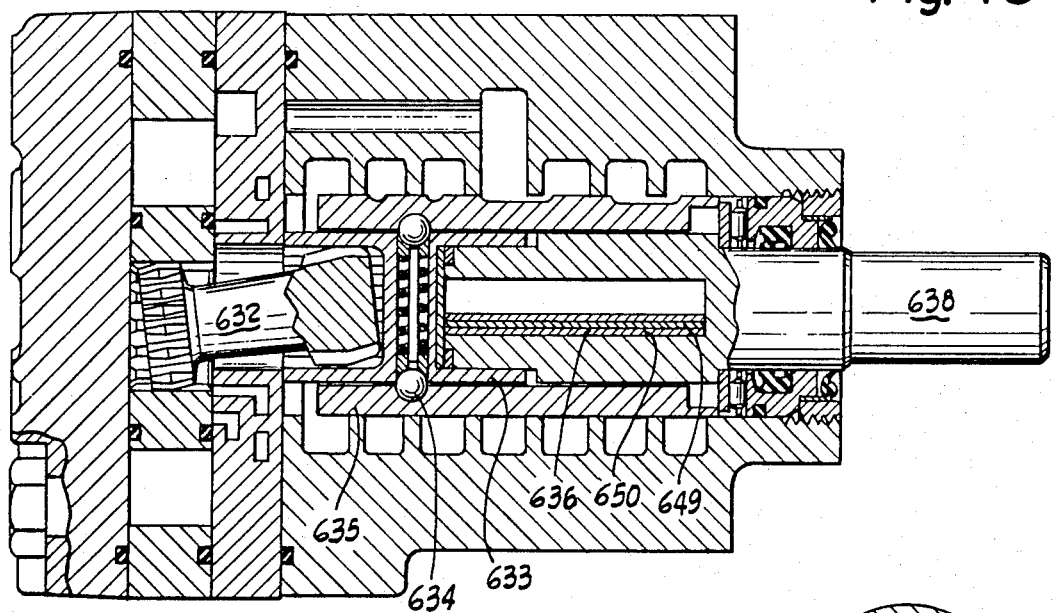
Fig. 48
Fig. 50
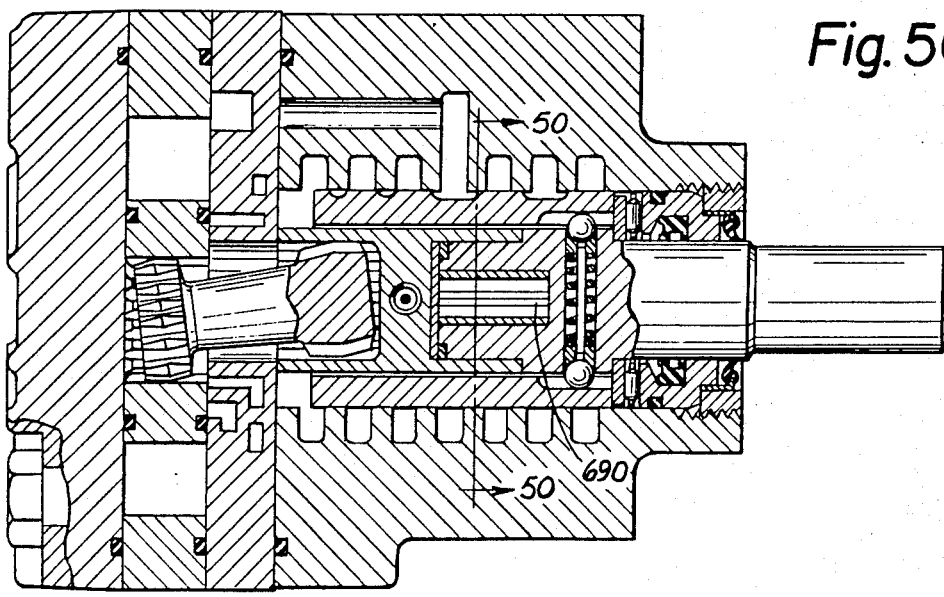
Fig. 49

HYDROSTATIC STEERING DEVICE

This present application is a continuation of co-pending application Ser. No. 812,443 filed on Dec. 23, 1985, abandoned, which is a continuation-in-part of Mr. White's prior now pending hydrostatic steering unit application Serial No. 763,001 filed August 6, 1985 abandoned. This application Serial No. 763,001 in turn was a continuation-in-part of now pending Serial No. 567,429 filed December 30, 1983, Pat. No. 4,552,519 which application is a continuation-in-part of now pending Serial No. 439,058 filed November 4, 1982 Pat. No. 4,494,916 which application is a continuation-in-part of Serial No. 381,946 filed May 26, 1982, abandoned which application is a continuation-in-part of serial No. 317,501 filed November 2, 1981, now issued as U.S. Pat. No. 4,494,915, which application is a continuation-in-part of Serial No. 51,508 filed June 25, 1979, now abandoned. This application Serial No. 763,001 was also a continuation-in-part of now pending application Serial No. 603,994 filed April 26, 1984, now abandoned, which application is a continuation of now abandoned Serial No. 390,328 filed June 21, 1982, which application is a continuation-in-part of Serial No. 360,832 filed March 23, 1982, now issued as U.S. Pat. No. 4,454,744, which application is a continuation-in-part of Serial No. 113,400 filed January 18,1980, now issued as U.S. Pat. No. 4,357,133, which application is a continuation of Serial No. 910,075 filed May 26, 1978, now abandoned.

This invention relates to an improved power steering device.

It is an object of this invention to reduce the physical size of hydrostatic steering devices.

It is an object of this invention to simplify the construction of hydrostatic steering devices.

It is an object of this invention to increase the the strength of hydrostatic steering devices.

It is an object of this invention to reduce the cost of hydrostatic steering devices.

A star-pointed annulus increases commutation fluid flow Other objects and advantages of the present invention will be apparent from the accompanying description and drawings in which:

FIG. 1 is a central longitudinal cross-sectional view through the hydrostatic rack and pinion steering device taken along lines 1—1 in FIG. 2.

FIG. 2 is a cutaway cross-sectional view of the device of FIG. 1 taken generally along lines 2—2 of that figure.

FIGS. 3, and 4 are partial sectional views of the torsion connection of the device of FIG. 1 taken generally along lines 3—3 in FIG. 2.

FIGS. 5 and 6 central longitudinal cross-sectional views of hydrostatic rack and pinion steering devices like FIG. 1 utilizing pressure balancing and integral passage features.

Figure 7:
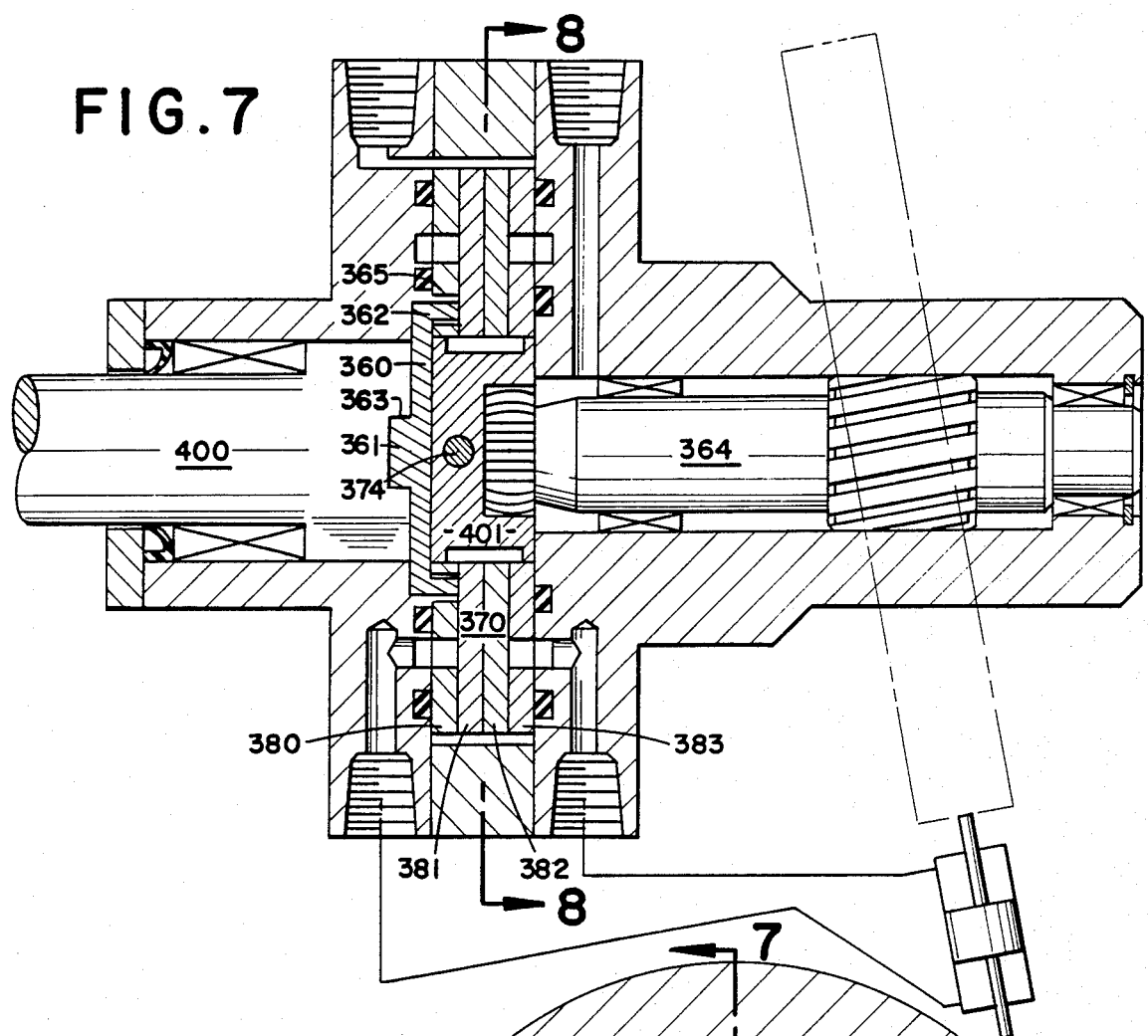

FIG. 7 is a central longitudinal cross-sectional view of a hydrostatic rack and pinion steering device like FIG. 1 with an alternate type of construction. The view is taken along lines 7—7 in FIG. 8.

Figure 8:
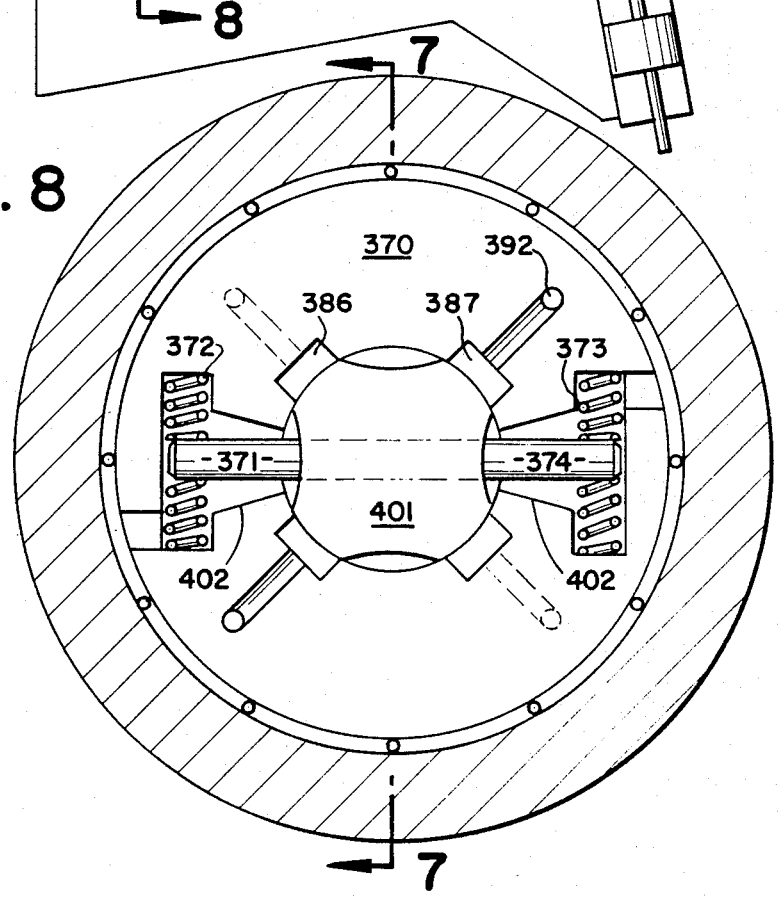
Figure 9:
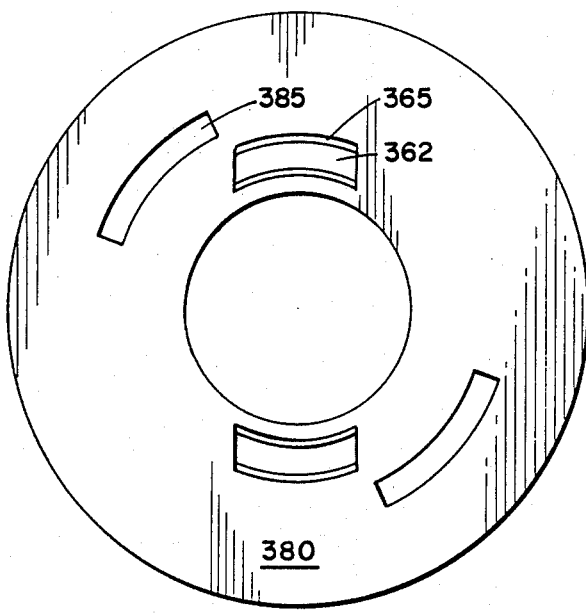
Figure 10:
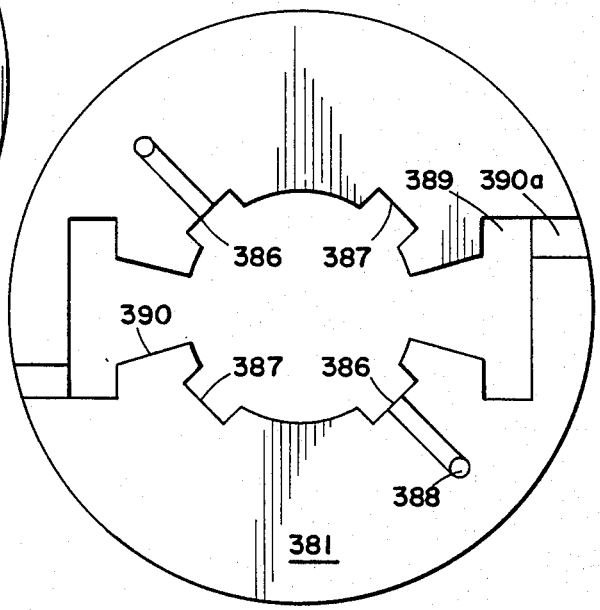
Figure 11:
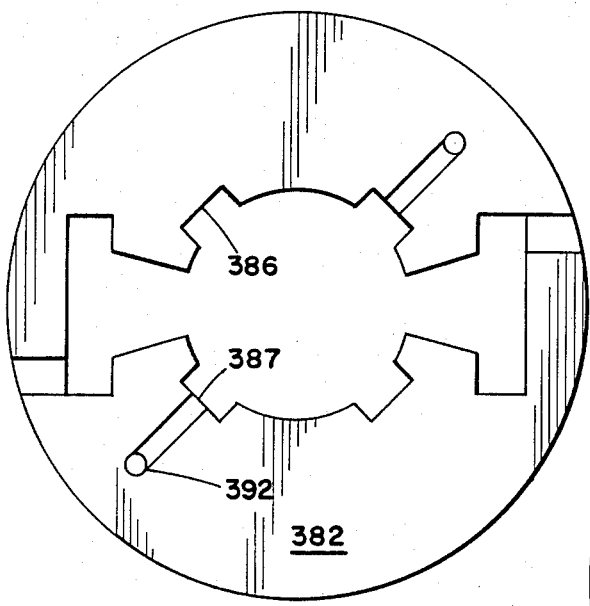
Figure 12:
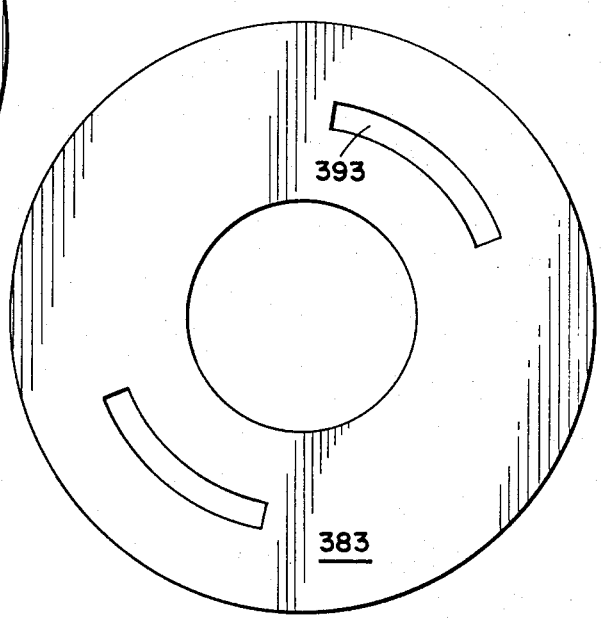

FIG. 8 is a cutaway cross-sectional view of the device of FIG. 7 taken generally along lies 8—8 of that figure.

FIGS. 9-12 are sequential views of the laminated rotor of the device of FIG. 7.

Figure 13:
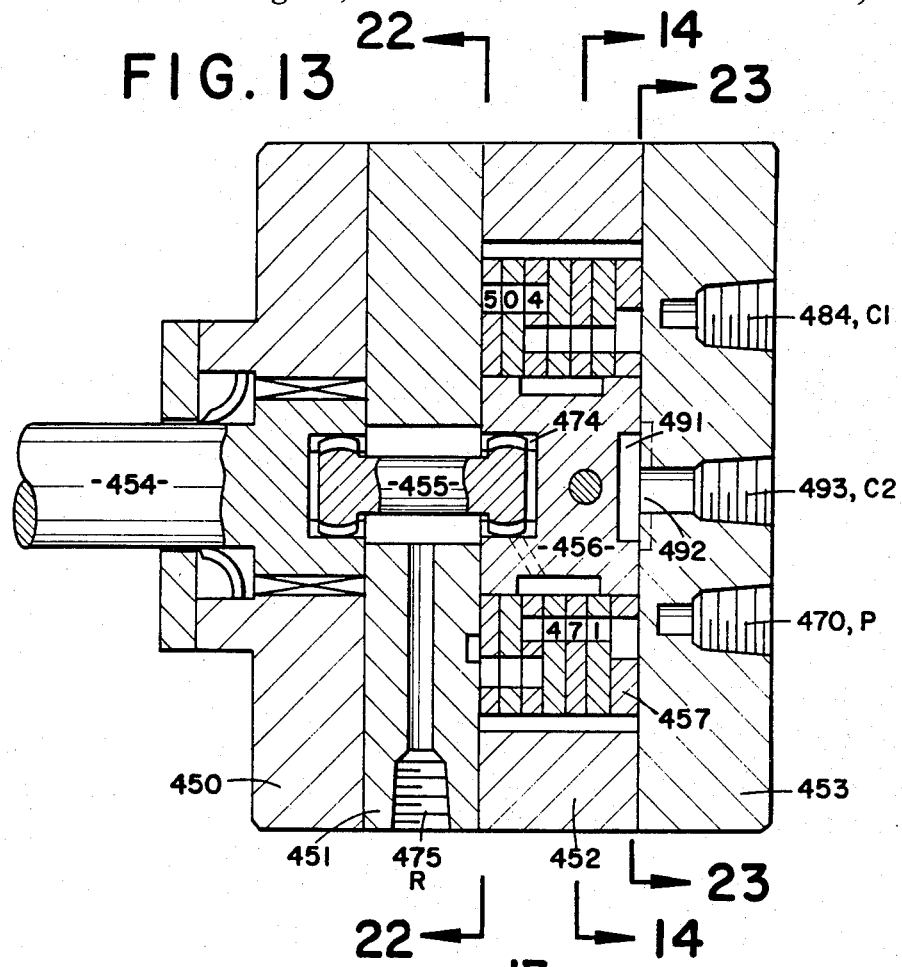

FIG. 13 is a central longitudinal cross-sectional view of a gerotor feedback hydrostatic steering device.

Figure 14:
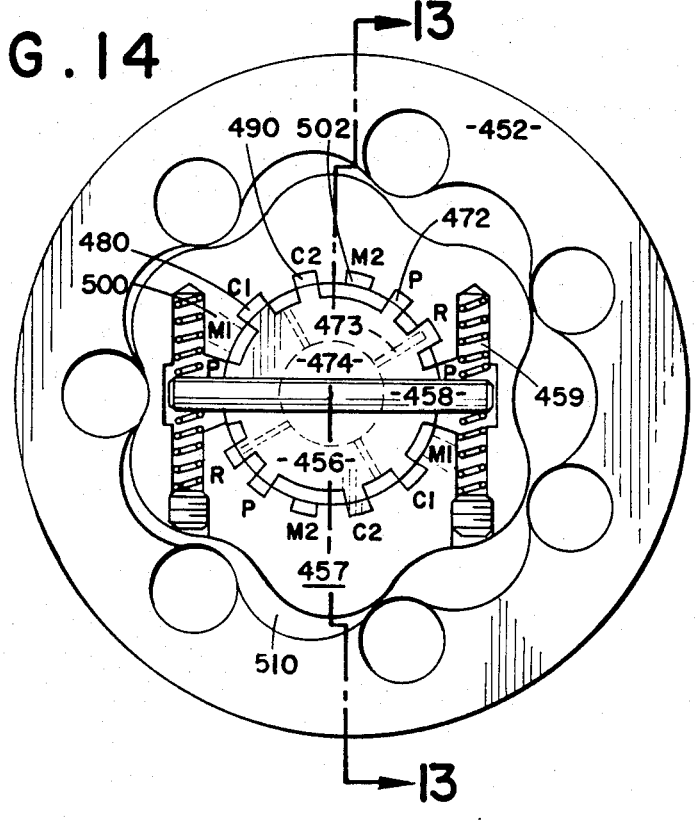
Figure 15:
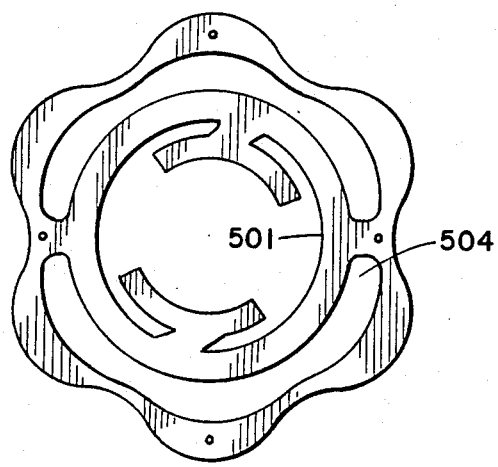
Figure 16:
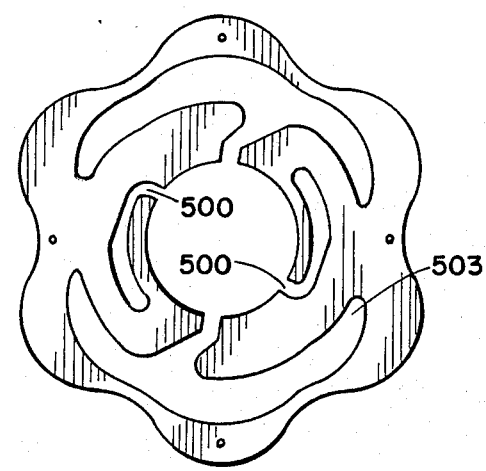
Figure 17:
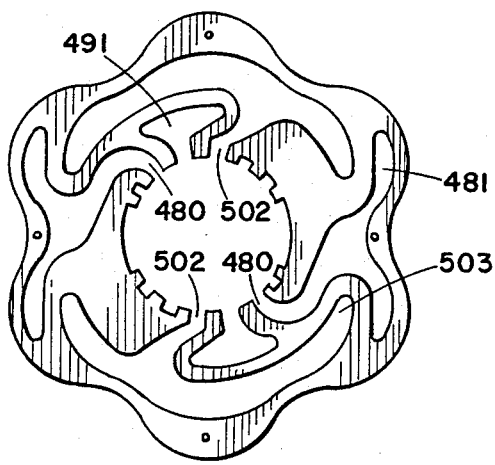
Figure 18:
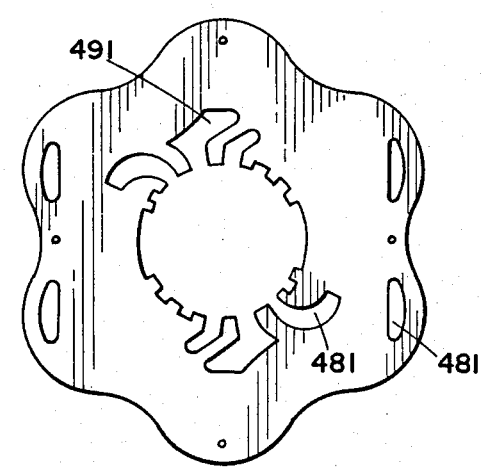
Figure 19:
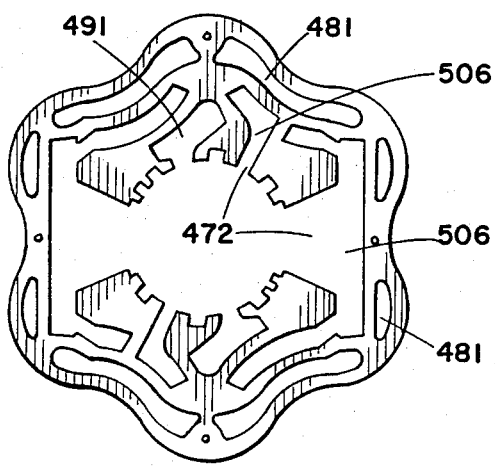
Figure 20:
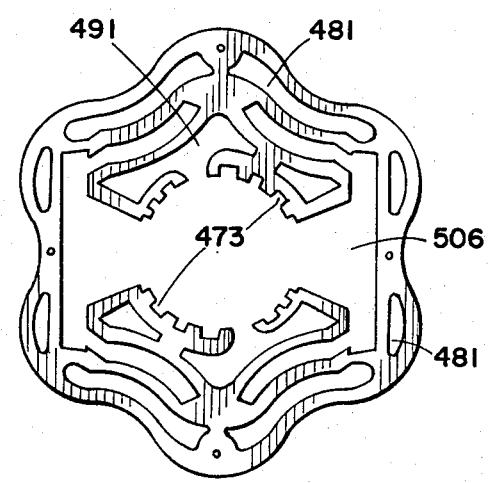
Figure 21:
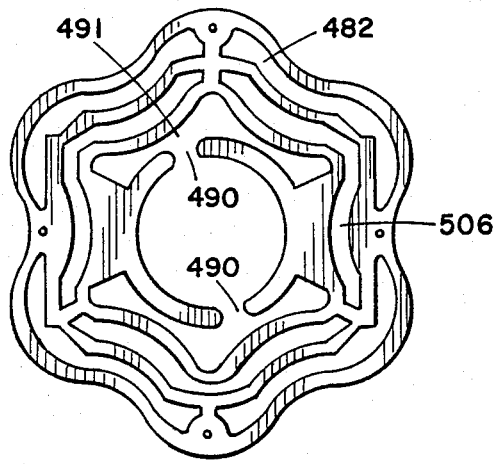

FIG. 14 is a cutaway cross-sectional view of the device of FIG. 13 taken generally along lines 14—14 of that figure.

FIGS. 15-21 are sequential views of the laminated rotor of the device of FIG. 13.

Figure 22:
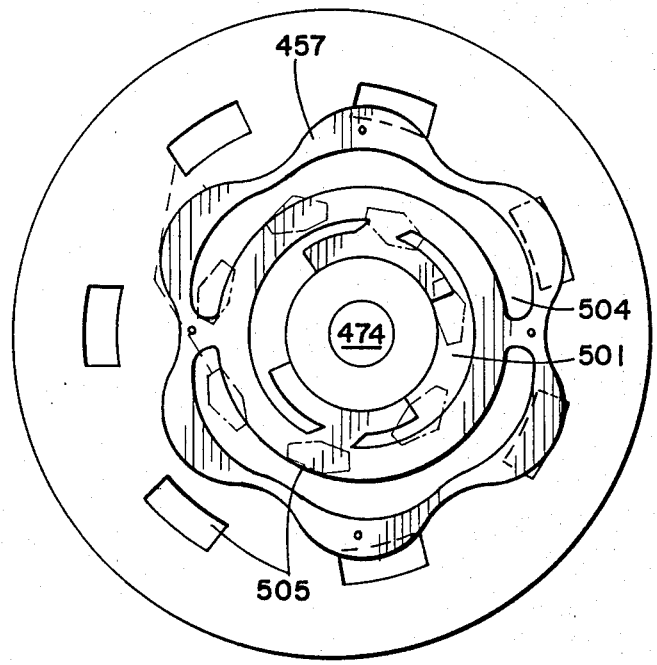

FIG. 22 is cross-sectional views of the device of claim 13 taken generally along lines 22—22 of that figure.

Figure 23:
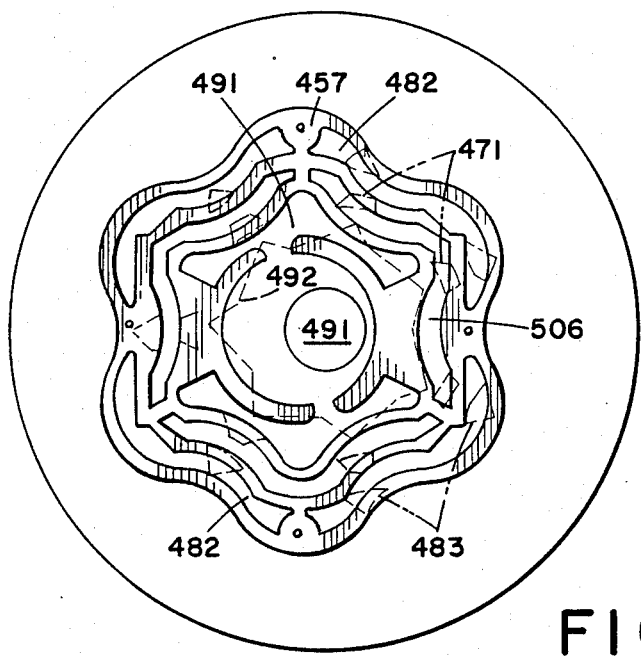

FIG. 23 is a cross-sectional view of the device of claim 13 taken generally along lines 23—23 of that figure.

Figure 24:
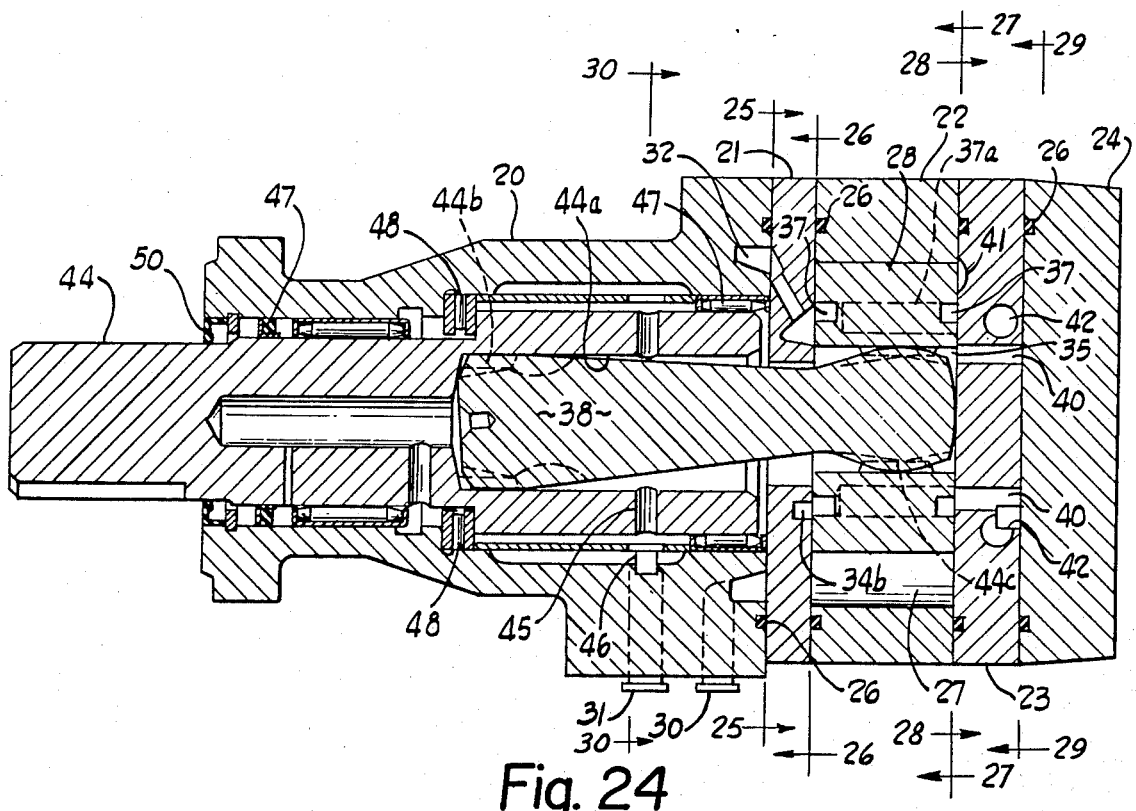

FIG. 24 is a central section view of a hydrostatic steering device including a star pointed annulus.

Figure 25:
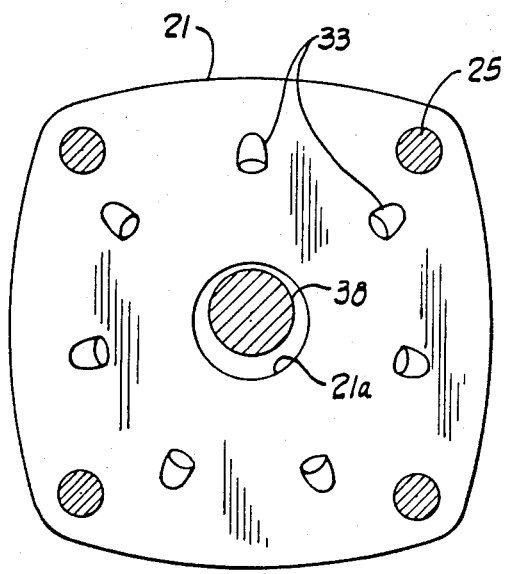

FIG. 25 is a sectional view taken along line 25—25 in FIG. 24.

Figure 26:
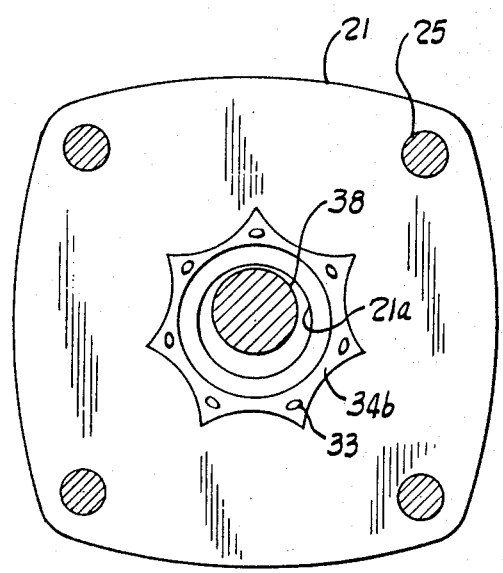

FIG. 26 is a sectional view taken along line 26—26 in FIG. 24.

Figure 27:
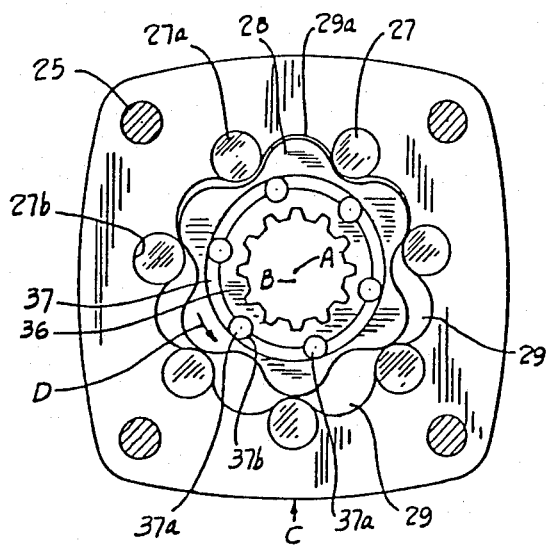

FIG. 27 is a sectional view taken along the line 27—27 of FIG. 24.

Figure 28:
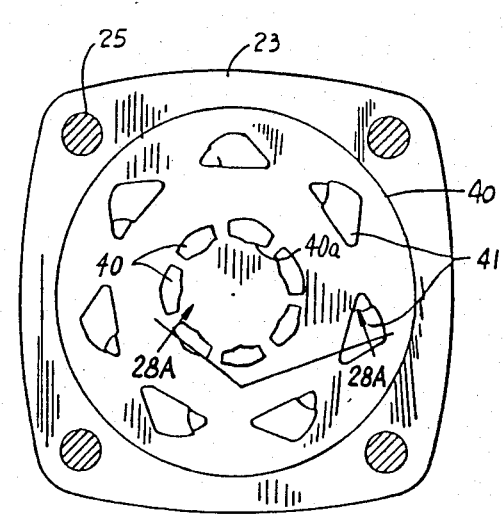

FIG. 28 is a sectional view taken along the line 28—28 of FIG. 24.

Figure 28A:
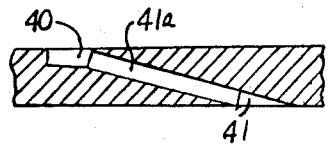

FIG. 28A is a fragmental view taken along the line 28A—28A of FIG. 28.

Figure 29:
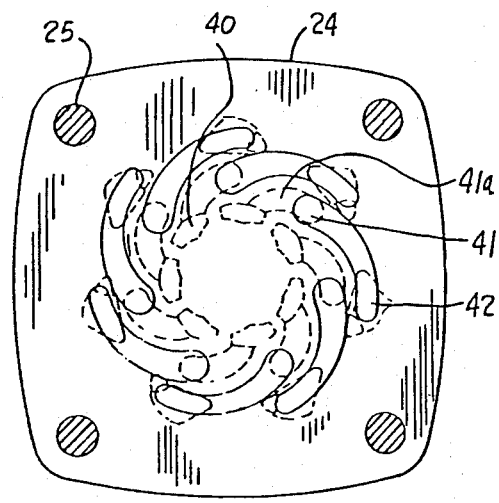

FIG. 29 is a sectional view taken along the line 29—29 of FIG. 24.

Figure 30:
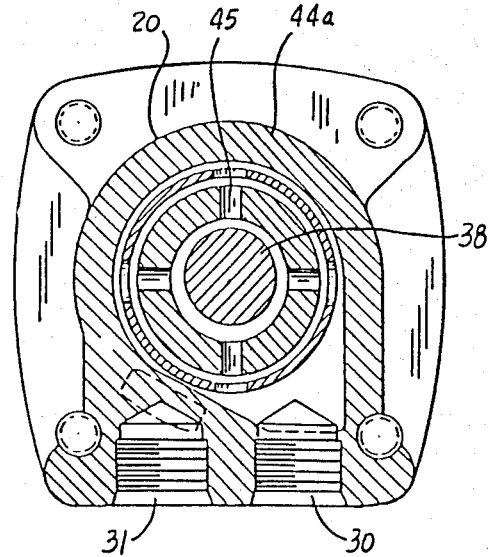

FIG. 30 is a sectional view taken along the line 30—30 of FIG. 24.

Figure 31:
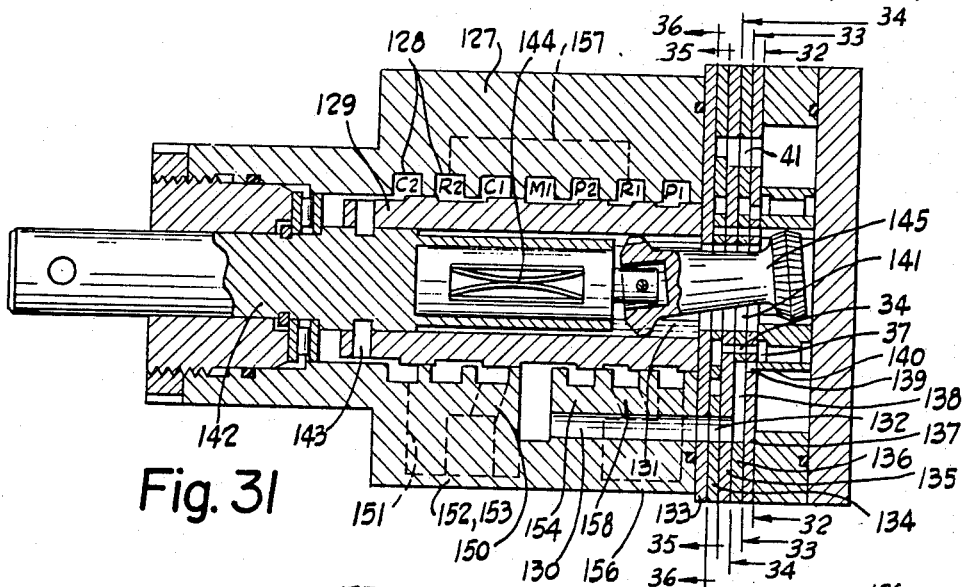

FIG. 31 is a central sectional view of a device with intermediate plate gerotor porting. The gerotor is contained in a power steering unit. The unit is of multi-plate construction.

Figure 32:
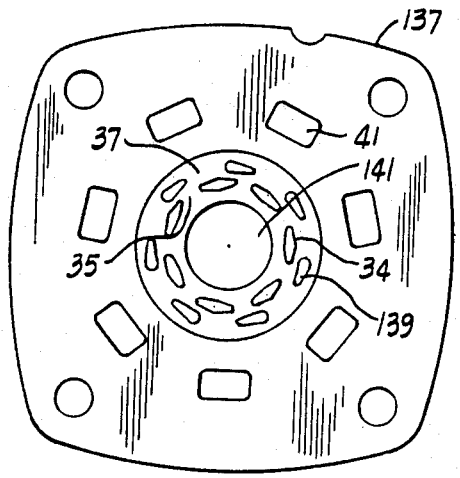

FIG. 32 is a view of the porting passages of FIG. 31 taken generally along lines 32—32 of that figure.

Figure 33:
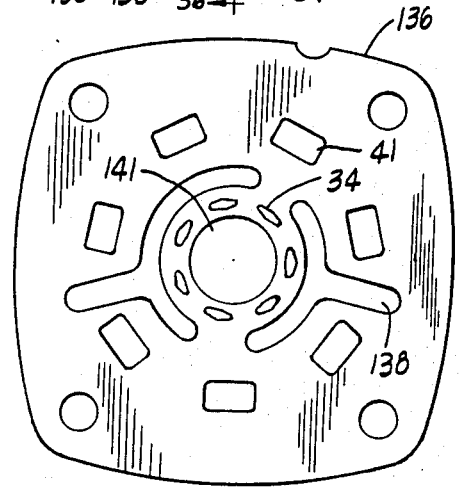

FIG. 33 is a view of the porting passages of FIG. 31 taken along lines 33—33 of that figure.

Figure 34:
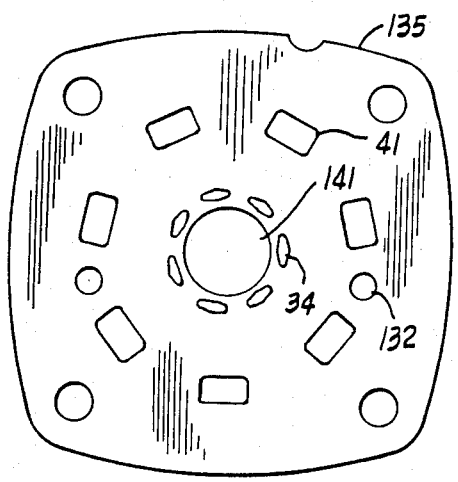

FIG. 34 is a view of the porting passages of FIG. 31 taken generally along lines 34—34 of that figure.

Figure 35:
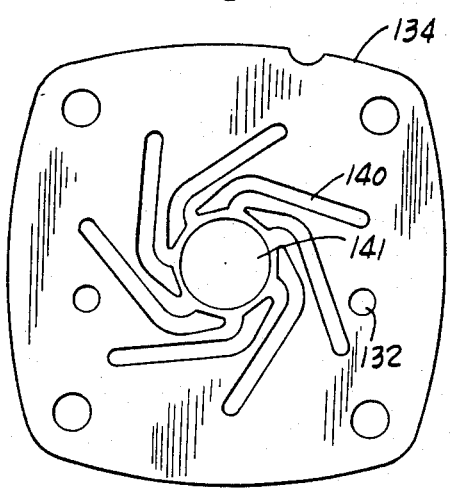

FIG. 35 is a view of the porting passages of FIG. 31 taken generally along lines 35—35 of that figure.

Figure 36:
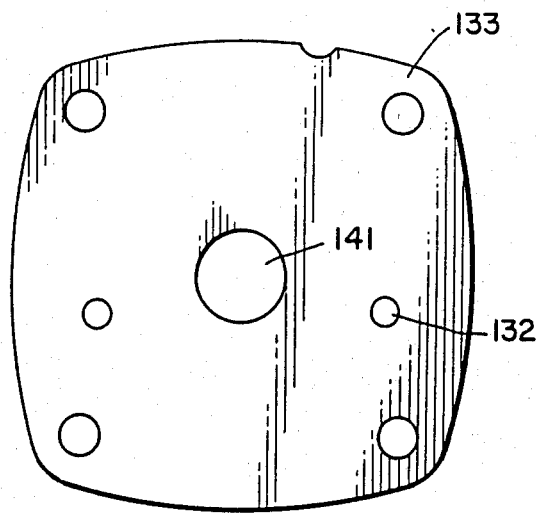

FIG. 36 is a view of the porting passages of FIG. 31 taken generally along lines 36—36 of that figure.

Figure 37:
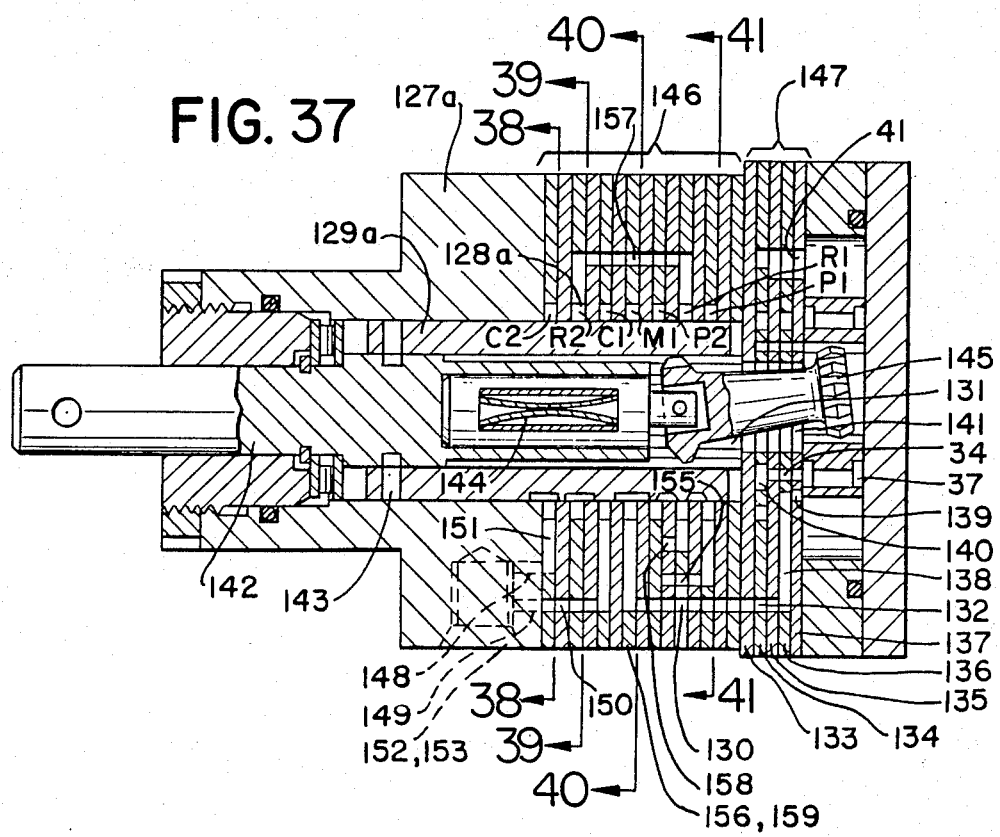

FIG. 37 is a central sectional view of a power steering unit similar to that of FIG. 31. This FIG. 37 further utilizing multi-plates to simplify the construction of the body of the unit.

Figure 38:
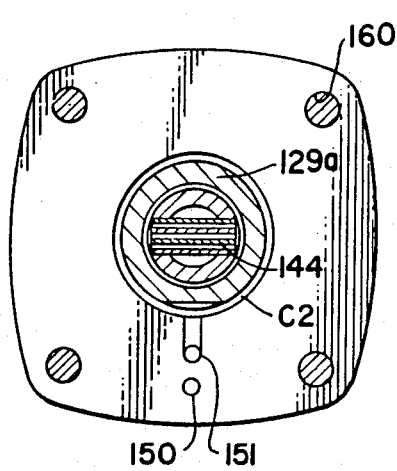

FIG. 38 is a view of the plates of FIG. 37 taken generally along lines 38—38 of that figure.

Figure 39:
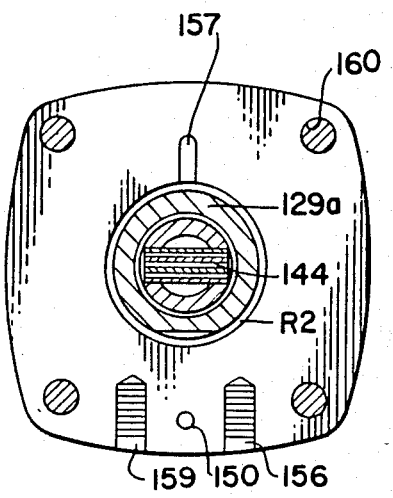

FIG. 39 is a view of the plates of FIG. 37 taken generally along lines 39—39 of that figure.

Figure 40:
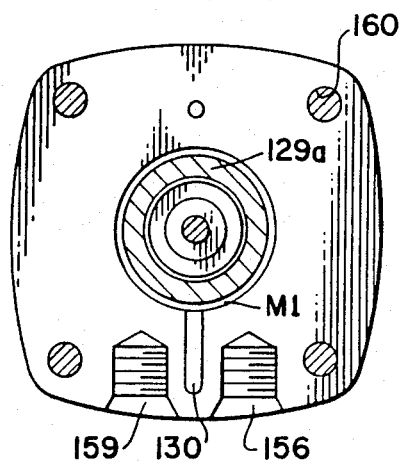

FIG. 40 is a view of the plates of FIG. 37 taken generally along lines 40—40 of that figure.

Figure 41:
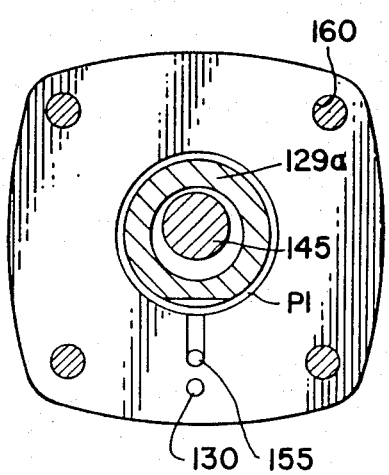

FIG. 41 is a view of the plates of FIG. 37 taken generally along lines 41—41 of that figure.

Figure 42:
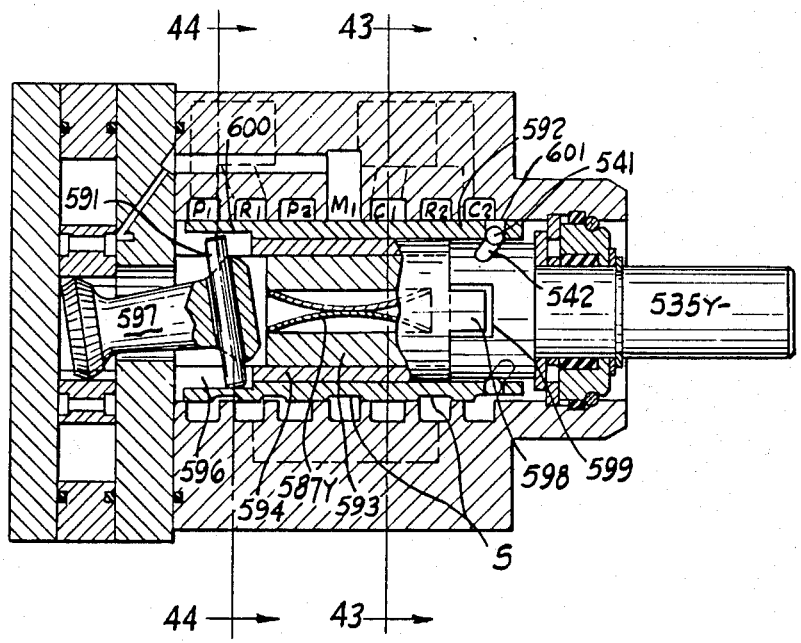

FIG. 42 is a central sectional view of an alternate hydrostatic steering device. This alternate embodiment has a heavy pin wobble stick drive link and a combined spool valve-slide member.

Figures 43, 44:
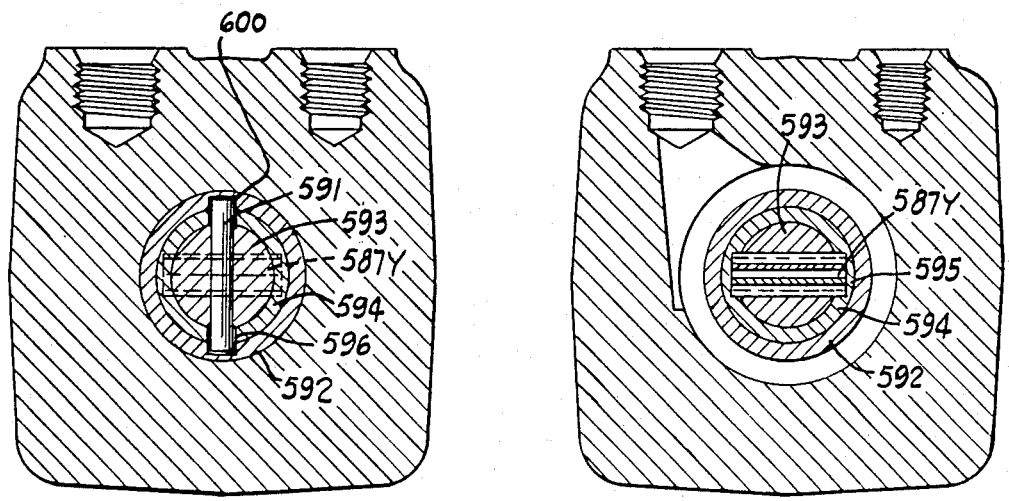

FIG. 43 is a sectional view of the alternate hydrostatic steering device of FIG. 42 taken generally along lines 43—43 of that figure.

FIG. 44 is a sectional view of the alternate hydrostatic steering device of FIG. 42 taken generally along lines 44—44 of that figure.

Figure 45:
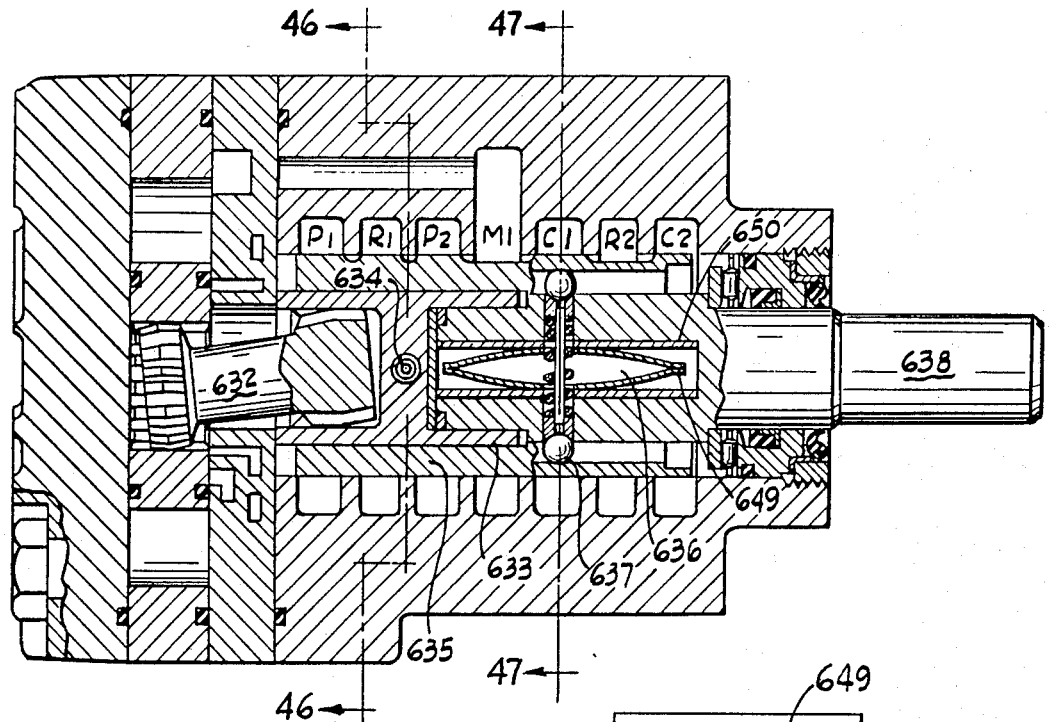

FIG. 45 is a central sectional view of a hydrostatic steering device.

Figure 45A:
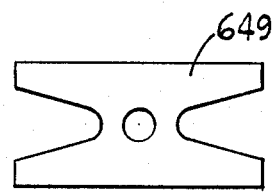

FIG. 45A is a top view of the leaf spring 649 of FIG. 45.

Figure 46:
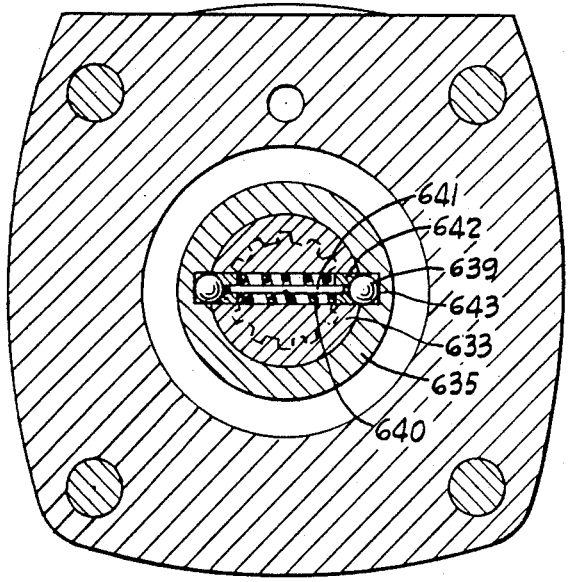

FIG. 46 is a sectional view of the device of FIG. 45 taken generally along lines 46—46 of that figure.

Figure 47:
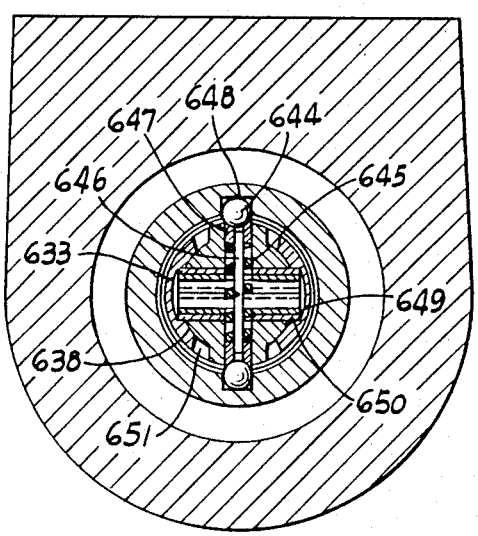

FIG. 47 is a sectional view of the device of FIG. 45 taken generally along lines 47—47 of that figure.

FIG. 48 is a central sectional view of the device of FIG. 45 with compressed springs.

FIG. 49 is a central sectional view like FIG. 45 with alternate lateral springs.

FIG. 50 is a sectional view of the device of FIG. 49 taken generally along lines 50—50 of that figure.

Referring now to FIG. 1, the improved heavy pin hydrostatic steering device includes a body 300, an insert 301, a drive shaft 302, a valve seat 303, a valve member 304, a pinion shaft 305, a rack 306 and a cylinder 307. The body 300 and insert 301 are formed of cast steel.

The pinion shaft 305 is rotatably mounted within the body 300 of the device by bearings 310. The pinion 312 of the pinion shaft 305 engages the rack 306 of the steering device. The insert 301 is mounted within the other end of the body 300 of the device. A snap ring 314 holds the insert 301 within the body 300 of the device. A wave spring 315 provides pressure on both sides of the valve member 304 captured between the insert 301 and body 300 of the device.

The valve member 304 is captured in a valve cavity 316 between the insert 301 and the body 300 of the device. The valve member 304 is rotatably connected to the pinion shaft 305 via small pin 317. The small pin 317 is fixedly connected to the pinion shaft 305 for rotation therewith. The pin 317 engages the valve member 304 in a radially extending slot 318. This slot allows the valve member 304 to float in respect to the pinion shaft 305 while at the same time rotating therewith (i.e. the rotational axis of the pinion shaft 305 need not correspond to the rotational axis of the valve member 304).

The valve member 304 has a central core 319, an outer diameter 320 and a drive cavity 321. Two pairs of symmetrically placed valving passages C1(322), C2(323) lead from the central core 319 of the valve member 304 to the facing surfaces of the valve cavity 316 from whence they communicate through two circular grooves 324, 325 in the body 300 and insert 301 of the device and two ports 326, 327 in the body 300 of the device to opposing sides of the cylinder 307. A "C" shaped torsion member 330 surrounds the outer diameter 320 of the valve member 304. Two small tabs 331 extending off of the valve member 304 extend into the opening 332 of the "C" shaped torsion member 330 (for reasons to be later described). The drive cavity 321 extends generally butterfly shaped through the central part of the valve member 304. The drive cavity 321 allows clearance for the movement of the heavy pin 333 (as will be later described). The drive cavity 321 also is the fluid passageway between the pressure port 334 in the body of the device and the valve (again to be later described).

The drive shaft 302 is rotatably mounted to the insert 301 of the device by bearing 335. The valve seat 303 is located within the central core 319 of the valve member 304 fixedly connected on a square section 336 of the drive shaft 302 for rotation therewith. The valve seat 303 includes a pair of opposed pressure grooves 337 (fed by the pressure port 334 through the drive cavity 321 of the valve member 304) and a pair of opposed return grooves 338 (fed from the return port 339 through passageway 340 in the insert 301 and the hole 341 through the valve seat 303).

The heavy pin 333 extends through the square section 336 of the drive shaft 302, the valve seat 303 and the drive cavity 321 into the opening 332 in the "C" shaped torsion member 330. The heavy pin 333 and torsion member 330 provide the torsion connection of the device. A separate cutaway square shaped point 350 on the drive shaft 302 fits into a square shaped hole 351 in the pinion shaft 305 to provide for the safety interconnection between the drive shaft 302 and pinion shaft 305.

In operation one rotates the drive shaft 302 in the direction desired. This rotation serves to rotate the valve seat 303 within the valve member 304 against the pressure of the "C" shaped torsion member 330 (the end of the heavy pin 333 within the opening 332 in the torsion member 330 moves in respect to the tabs 331 of the valve member 304 to provide a springing force—contrast FIG. 3 with FIG. 4). The rotation of the valve seat 303 within the valve member 304 connects the pressure groove 337 of the valve seat 303 with one of the surrounding C1 or C2 grooves (322 or 323 respectively) and the return groove 338 with the other of the surrounding C1 or C2 grooves. This fluid valving causes the cylinder 307 and rack 306 to move which in turn causes the pinion shaft 305 to rotate. This rotation moves the valve member 304 through the pin 317-slot 318 connection to a new neutral position, thus completing movement of the steering system. In the rare event of system failure the direct lost-motion type connection 350-351 between the drive shaft 302 and pinion shaft 305 provides a solid mechanical steering connection for the device. Note that while the fluid passage to and from the cylinder is shown in representational form as hard piping or hoses, such connections could equally well be made in total or part by passages within the body 300 of the device. This construction is shown in FIG. 5.

Through a slight reorientation of the pressure feed and/or C1 324 and C2 325 communication grooves it is possible to pressure balance the valve member 304. One way to accomplish this is to have both the C1 and C2 grooves on a single side of the valve member, each groove C1, C2 individually having roughly the same surface area X, with a substantially equal area connected to the pressure feed on the opposing side of the valve member. As shown in FIG. 5 this can be accomplished with one pressure feed seal 343 located down on the opposing side of the valve member 304A asymmetrically located in respect to the seal 344. By having the surface areas pressurized individually by C1 324A, C2 325A on one side of the rotor and the surface area radially outward of the seal 343 pressurized by the pressure feed 334 on the other side of the rotor all substantially equal by such asymmetrical location of the seal 343 the pressure on the opposing sides of the valve member 304A will be balanced during the operation of the valve regardless of whether C1 324A or C2 325A is pressurized. Note that although the embodiment of FIG. 5 is shown with the second pressure seal 344 located radially outward of the valve member 304A and with a radial pressure feed, one could equally well locate the seal 344 on the same surface as the C1 and C2 grooves. (One ideally would locate such seal 344 so near to the outer edge 345 of the valve member 304A that no additional compensation for pressurized area would be necessary in the asymmetrical location of the first pressure seal 343). Such same surface location would remove the need for the close tolerance fitting of the valve member 304A within the valve cavity 316 and allow such valve member to float as in the device of FIG. 1. The same sort of pressure balancing could be produced by moving the entire pressure feed to the side of the valve member 304A opposite the C1 324A and C2 325A grooves. Again the surface area pressurized by the pressure feed would be substantially equal to the individual areas pressurized by the C1 or C2 grooves respectively so that no matter which groove C1 or C2 was pressurized one again would produce substantially equalized pressure loading on the valve member 304A.

An additional way to pressure balance the valve member is to include pressurized seals opposing the C1 and C2 commutation grooves as shown in FIG. 6. In this embodiment the commutation grooves C1 324B and C2 325B grooves are located on opposing sides of the valve member 304B. Small auxiliary passages 347 extend off of the C1 and C2 passages 348 within valve member 304B to terminate on the inner sides of certain seals 349. The seals 349 move like pistons in respect to the valve member 304B. The outer surface area of the seals 349 is substantially equal to the respective commutation area of the C1 324B and C2 325B commutation grooves. Therefor if the groove C1 324B is pressurized the pressure also pressurizes the inner sides of the corresponding seal 349 on the opposing face of the valve member 304B. Since the areas so pressurized are substantially equal, the valve member 304B is pressure balanced. The same thing happens if the groove C2 325B and its corresponding seal 349 are pressurized. As an alternative the passages 347 could pressurize equalization grooves on the opposing side of the valve member 304B instead of the seals 349. This alternative would, however, necessitate additional seals on such opposing face or a reduced efficiency due to fluid bypass. (Since the pressure is fed radially of the valve member 304B such feed does not axially imbalance the valve member 304B. Such feed is therefor of no real concern. Again the location of the seals could be changed to the sides of the valve member 304B to allow it to float as in the device of FIG. 1.)

Note that in the more sublime versions of pressure balancing the valve member 304 would be pressure balance optimized for the maximum performance. For example if 75% of the time the valve member was rotated plus or minus 15 degrees in respect to the valve seat, one would select surface areas on opposing sides of the valve member to pressure balance it for this condition, accepting the limited pressure imbalance for pressure values under or exceeding the condition. Under these more sublime versions one would have differing balancing groove parameters for a race car (mostly straight line operation), a small commuter car (constant direction change) or an industrial tractor (limited periods of lock to lock direction change).

The pressure balancing of the valve member 304 reduces the wear on the device, increases the efficiency by reducing fluid leakage and otherwise improves the functioning of the device.

Another alternate embodiment of the device of FIG. 1 is disclosed in FIGS. 7-12. In this device the valve member is connected to the drive shaft (instead of the pinion shaft as in FIG. 1) and the valve seat is connected to the pinion shaft (instead of the drive shaft as in FIG. 1). In addition, a free floating coupling ring connects the valve member to the drive shaft, the spring connection utilizes coil springs, and the valve member is of laminated plate construction.

The device of FIGS. 1-4 was shown and described as having the valve seat connected directly to the drive shaft and the valve member indirectly connected to the pinion shaft. This device could also be constructed by interchanging the interconnections of the various members. Such alternate interconnections are shown in FIG. 7. In this alternate interconnection the valve member 370 is connected to the drive shaft 400 and the valve seat 401 is connected to the pinion shaft 364. (The valve operates by rotation of the valve member in respect to the valve seat instead of vice versa as the device in FIG. 1.)

The valve member 370 is connected to the drive shaft 400 with a coupling ring 360. The free floating coupling ring 360 of this alternate embodiment is a circular ring with two pair of opposing flanges 361, 362 extending axially off the opposing sides thereof. One 361 of the pair of opposing flanges is drivingly connected to a groove 363 in the pinion shaft 364. The other 362 of the pair of opposing flanges is drivingly connected to a groove 365 in the valve member 370. As in the embodiment of FIG. 1 this second groove 365 allows for the flanges 362 to move radially inwards and outwards of the valve member 370. This free floating coupling ring 360 performs the function of the pin 317 of the embodiment of FIG. 1 (as well as the lost motion connection as will be later described).

The spring connection 371 of this alternate embodiment utilizes two pairs 372, 373 of coil springs at opposing ends of a heavy pin 374 between the heavy pin 374 and the valve member 370. This spring connection 371 performs the function of the "C" shaped torsion member 330 of the embodiment of FIG. 34.

The valve member 370 of this alternate embodiment is of multi-plate construction. As shown in FIG. 7 and in FIGS. 9-12, the valve member 370 is fabricated of a series of four plates 380,381,382,383 brazed together to form a unitary piece. Four plates are formed in a selected cross-sectional pattern. The first plate 380 includes a segmented commutation ring 385 and the free floating coupling ring engagement grooves 365. The second plate 381 includes C1 and C2 grooves 386,387, passages 388 to connect the grooves C1 (386) to the commutation ring 385 in plate 380, a spring cavity 389 and a drive cavity 390. Small grooves 390a extend from the drive cavity 390 to connect such cavity to the pressure port 391. The third plate 382 is similar to the second plate 381 except that passages 392 connect the grooves C2 (387) to a commutation ring 393 in plate 383. Plate four 383 has a segmented commutation ring 393.

The multi-plate valve member 370 performs the function of the valve member 304 and of the lost-motion type connection 350-351 of the embodiment of FIG. 1. (The valve member 370 performs the function of the lost-motion connection 350-351 of transferring physical force from the drive shaft 400 through coupling ring 360 to the valve member 370 thence through the sides 402 of the drive cavity and the heavy pin 374 - valve seat 401 to the pinion shaft 364. There is no direct lost-motion connection between the drive shaft 400 and pinion shaft 364 of this alternate embodiment.)

FIGS. 13-23 disclose a fully hydraulic alternative embodiment similar to the embodiment of FIGS. 7-12. In this device a gerotor structure replaces the rack and pinion steering mechanism. The body of this device includes a face plate 450, a laminated valving plate 451, a stator 452 and an end plate 453. The main operative members are an input shaft 454, a wobble stick 455, a valve seat 456 and a valve member-rotor 457. The input shaft 454 is rotatably mounted to the face plate 450. The valve seat 456 is cocentrically rotatively mounted within the valve member-rotor 457 which in turn fits within the stator 452. To ease understanding of the valving of the device the valve seat in FIGS. 13 and 14 has been enlarged. The wobble stick 455 connects the input shaft 454 to the valve seat 456. The valve seat 456 itself is mechanically connected to the valve member-rotor 457 via a heavy pin 458 and coil springs 459 in a fashion similar to the heavy pin 374 and springs 372–373 of the embodiment of FIG. 7.

The rotor 457 and valve seat 456 are the main operative pieces of this fully hydrostatic device. As shown in FIG. 15–23 the pressurized fluid enters the device through port 470 to pressurize a series of commutation holes 471 on one side of the end plate 453. From the holes 471 the pressurized fluid passes through a segmented passage 506 in the valve member-rotor 457 to pressurize the P grooves 472 in the valve member-rotor 457. The return fluid passes from the R grooves 473 in the valve seat 456 and valve member-rotor 457 through a commutation hole 474 on the other side of the valve seat 456 (the gaps and holes in the wobble stick 455 - valve seat 456 drive connection) to exit the device via the return port 475. The cylinder 1 grooves 480 in the valve member-rotor 457 pass through passages 481 within the valve member-rotor 457 to a second segmented commutation passage 482 on the pressure port side of the valve member-rotor 457. This second passage 482 communicates through a set of commutation holes 483 in the end plate 453 to the C1 port 484. The cylinder 2 grooves 490 in the valve member-rotor 457 abut an inner commutation ring 491 which connects with a star-shaped opening 492 in the end plate 453 and thus the C2 port 493. The M1 groove 500 abuts an inner valving ring 501 on the return side of the valve member-rotor 457. The M2 groove 502 connects through the valve member-rotor 457 via passages 503 to the outer valving ring 504 on the return side of the valve member-rotor 457. These two valving rings 501, 504 selectively communicate with the expanding contracting gerotor cells 510 (as respectively appropriate) through the valving openings and valving passages 505 in the laminated valving plate 451 (see FIG. 22). The details of this valving plate 451 are laid out later on in this application (and Mr. White's patent 4,474,544 issued October 2, 1984).

This fully hydrostatic device of FIGS. 13–23 operates in a manner similar to that of the rack and pinion embodiments except that the return and fail safe operation is fluidic instead of mechanical.

The pressure and return commutation of this hydrostatic device utilizes star-shaped commutation. This star-shaped commutation is described in FIGS. 24–30. The embodiment includes a main housing unit 20 having a radially flat inner end to which is respectively attached a wear plate 21, a gerotor set 22, a manifold 23 and an end cap 24, all of these being secured together by bolts 25, which are shown in the various sectional views but omitted from FIG. 24, but those skilled in this art will recognize that the bolts have heads pressing against the outer right-hand end of the end cap 24 and extending through the members 21, 22 and 23 and threaded tightly into the main housing portion 20. Sealing rings 26 seal all of the members against leakage between them.

The gerotor set 22, best seen in FIGS. 24 and 27, comprise an internal toothed member 27 which is a stator inside of which a coacting externally toothed member 28, a rotor, which rotates about its own axis A as seen in FIG. 27, but which is eccentric relative to the center of the stator 27 by the distance shown between A and B, on the line of eccentricity C, and the rotor orbits about the center B. During this movement of the rotor and stator a series of cells 29 and 29a form a series of cells of constantly changing size between the rotor and stator, the size of the cells becoming greater on one side of the line of eccentricity, and the cell size becoming smaller on the opposite side. In FIG. 27 the minimum cell size at 29a approaches zero. The rotor rotates in the direction of the arrow shown in FIG. 27. The rotor has two flat axial end surfaces.

The inlet means to the housing is indicated at 30. The fluid outlet means is shown at 31. The inlet means is connected by means indicated only in dot-dash lines through a continuous annulus or distribution channel 32 in the main housing portion 20. This annulus opens through the wear plate 21 which has a number of through openings or fluid travelways 33, the number of which is not important, but sufficient to take care of the flow of fluid necessary. These openings 33 are connected by connecting passages 33a to the annulus or annular ring transfer channel 34 of smaller diameter on the opposite face of the wear plate and opening into the rotor cavity toward the gerotor 22.

The annulus 34 may be ring-shaped or star-pointed (FIGS. 24 and 26). The ring-shaped annulus 34 is symmetrical - a channel of uniform diameter and depth. The star-pointed annulus 34b, in contrast, has a shape dictated by the area swept by the passageways 37 through the rotor 28 during the rotation of the rotor 28. The star-pointed annulus 34b is of varying diameter and depth - widest and deepest at the points of the annulus 34b. The connecting passages 33a intersect with the star-pointed annulus 34b at the points of the annulus 34b.

The internal teeth 27a on the stator 27 are provided by cylinders 27a inserted in recesses 27b over 180 in circumference so as to maintain the cylinders 27 in the positions shown in FIG. 27. It will be understood that the cylinders 27a terminate at the level of the opposite faces of the stator 27. The rotor 28 has external teeth which are formed to fit almost exactly between the internal teeth of the stator, as shown in FIG. 27. The rotor 28 has an open center surrounded by a sealing strip 36 which is uninterrupted circumferentially and laterally outside of which is an annular liquid intake passageway 37. The axis of rotation for the wobble stick 38 is marked A in FIG. 27. The axis of rotation for the orbiting movement of the wobble stick 38 relative to the stator is indicated at B in FIG. 27. The line C passing through A and B is herein indicated as the line of eccentricity. The movement of the rotor herein described is as indicated by the arrow D in FIG. 27. During this rotation the cells 29 on the left-hand side of the line of eccentricity increase in size gradually while the cells 29 on the right-hand side of the line of eccentricity gradually decrease in size as indicated in FIG. 27. The rotor functions as the main valve for the device. The rotor functions as the main valve for the device. Six travel passageways or holes 37a are evenly spaced around the annulus 37 extending linearly through the rotor parallel to the axis of the rotor. These project radially inwardly from the annulus or annular channels 37 as seen at 37b, in one embodiment this being about ⅛ of an inch projection. The other travel passageway is generally on the central axis of the rotor, in the structure disclosed around the wobble stick-rotor device connection. There are sufficient openings in this type of drive connection that fluid flow is relatively unimpeded by the spline-gear interfaces. The transfer channel 34 communicates with the annular channel as the device is operated.

A manifold 23 connects the rotor valve with the gerotor cells. The manifold 23 will be best shown in FIGS. 28, 28A and 29. Seven parallel through openings to extend through the rotor facing surface of the manifold 23 parallel to its axis. This set of openings, as best seen in FIG. 28 and 29, have a peculiar cross section. These openings 40 will be herein described as "double-trapezoidal". Referring to FIG. 28, it will be seen that one of these openings appears substantially like two trapezoids facing each other with no middle partition and having opposite ends which are not quite parallel but instead are radial. The radially inner side of each opening is composed, not of straight lines, but of lines slightly concave inwardly meeting in a slight peak at the center 40a. The outer wall of this opening radially, as seen in FIG. 28, may be composed of two straight lines meeting in the center or preferably a single line slightly convex radially outwardly. The size of each of these openings is such as to fit in the opening, seen in FIG. 27, between two of the cylindrical openings 37a in a circumferential direction and between the central opening and the annulus 37 in a radial direction. These openings 40 are swept by the travel passageways in the rotor as the device is operated. This performs the primary valving function of the device. Each of the openings 41, as seen in FIGS. 28 and 29, of which there are seven evenly spaced, on the side of the manifold toward the gerotor are connected by fluid passageways 41a and 42 sloping inwardly and downwardly to one of the openings 40 just described.

The manifold 23, as seen in FIG. 29, shows seven inclined passageways 42 in solid lines which coact with the structure described in connection with the openings 41, passageways 41a and openings 40 as previously described. These coacting passageways are shown in broken lines in FIG. 29 to show the cooperation. Seven of such passages 42 are provided extending part way through the manifold from side to side. These are at a slight angle to the axis of the gerotor and are spaced at a diameter to register, as shown in FIGS. 28 and 29. It will thus be seen that each passageway 42 in the manifold mates with one of the passages 41a half way through the manifold so that each of the seven passages 40 combines with one of the passages 41a, 42.

The elongated rigid wobble stick 38 is clearly seen in FIG. 24 and shown in section in FIGS. 25 and 26. One end of the wobble stick has a spline connection 44b with the drive shaft 44. It will be noted that this shaft has a solid outer end and a hollow inner end as indicated at 44a. The opposite end of the wobble stick has a spline connection 44c in a central bore in the rotor 28. These spline connections are provided in such a manner that the wobble stick may rotate and orbit around the center axes A,B and that fluid can continuously flow over and around them. The exhaust passageway includes the open center 35 of the rotor over and around the wobble stick-rotor drive connection and the open center 21a of the wear plate and the hollow 44a, and is completed by four radial passageways 45 and 46 which are connected as shown in dot-dash lines, with the outlet 31.

Suitable needle bearings are shown at 47 and 48 supporting the drive shaft 44 in the main housing portion 20. Also suitable sealing means as shown at 49 and 50 are provided where the drive shaft passes out of the main housing portion 20.

This embodiment has been described as a pump utilizing the drive shaft 44 for the attachment of power which would cause intake of lower pressure fluid at 30 and exhaust of higher pressure fluid at 31. As previously explained, reversing the connections 30 and 31 will cause the device to operate as a motor producing power on the drive shaft 44.

The operation of the embodiment as a pump will now be described. Power is supplied to the protruding left end of the drive shaft 44 as seen in FIG. 22. This rotates the shaft, the wobble stick 38, the rotor 28, and also causes the rotor to orbit about the stator 27. This causes the cells 29 to the left of the line of eccentricity C to gradually increase in size causing a suction at the intake 30. The cells 29 on the right-hand side of the line of eccentricity C in FIG. 24 are also caused to progressively decrease in size thus causing the fluid under increased pressure to exhaust at the outlet 31. The incoming fluid from intake 30 passes through the annular channel 32, the passageways 33a to the annular channel 34, then through the rotor 28 through the annular channels 37 and the cylindrical holes 37a, then through the double trapezoidal openings 40 in the manifold 23, then through the passageways 41a and 42 in the manifold and through the openings 41 in the manifold and rotor and thus into the expanding cells 29. Other cells 29 are exhausted back through other openings 41 and other passageways 42 and 41a and other double trapezoidal openings 40 in the manifold into the center 35 of the rotor. The fluid flows over and around clearances in the wobble stick-rotor drive connection, cooling and lubricating it, through the opening 21a, through the hollow portion 44a of the shaft and through openings 45 and 46 and thus out through the outlet 31.

If the rotary fluid pressure gerotor device incorporates the star-pointed annulus 34b the commutation fluid passage is more direct and less constrained than with a ring-shaped annulus 34. Please note that other commutation channels in the gerotor device can also benefit from being star-pointed—for example annular channel 37.

FIG. 31 is of a multi-plate intermediate plate ported hydraulic device. The device is disclosed in a power steering unit 127. FIG. 37 is of a similar unit 127a having multi-plate body construction. The fluid passages within these multi-plate construction devices are identical in function. The devices will be described together.

The fluid recesses 128, 128a are arranged about the slide member 129, 129a in a cylinder 2(C2), return 2(R2), cylinder 1(C1), media 1(M1), pressure 2(P2), return 1(R1) and pressure 1(P1) layout.

The cylinder 1(C1) and cylinder 2(C2) recesses are connected through passages 150,151 and ports 152,153 in the power steering unit 127,127a and high pressure hydraulic hoses to opposing sides of a double acting hydraulic steering cylinder (all not shown). The pressure 1(P1) and pressure 2(P2) recesses are connected through passages 154,155 and port 156 in the power steering unit 127, 127a and high pressure hydraulic hoses to the high pressure outlet of a hydraulic pump driven by an engine (all not shown). The return 1(R1) and return 2(R2) recesses are connected together through passages 157 and through passage 158 and port 159 in the power steering unit 127, 127a and high pressure hydraulic hoses to the low pressure inlet of the hydraulic pump (all not shown).

In operation the selective rotation of the input shaft 142 is transformed into axial movement of the slide member 129, 129a through a pin-helical groove connection 143 within the limits of motion allowed by the torsion spring connection 144 to the wobble stick and thereafter into direct rotation of the wobble stick 145.

The axial movement of the slide member 129, 129a interconnects the recesses 128, 128a and passages 130-131 selectively. In the turning position shown in drawing 29 passage 130 is connected through the media 1(M1) recess to pressure 2(P2) and the center passage 131 of the device is connected to cylinder 2.

The fluid from passage 130 travels through holes 132 in plates 133, 134 and 135 and the commutation passages 138 in plate 136 to the seven outer annulus holes 139 in plate 137.

From the outer holes 139 in the plate 137 the fluid communicates through channels 37 to some of the openings 34 that are located inside the outer holes 139. The openings 34 extend through plates 137, 136 and 135 to connect with the spiral passages 140 in plate 134, and through spiral passages 140 to connect with openings 41, respectively. Openings 41 extend through plates 135, 136 and 137 to open into the gerotor cells of the device 127, 127a.

While the outer holes 139 are communicating by openings 34 to openings 41 leading to expanding gerotor cells, fluid from openings 41 leading contracting fluid cells communicates directly with the center passage 131 of the device through the drive hole 141 in the center of the rotor.

In an opposite turn the reverse would be true.

FIG. 37 is shown in a neutral unturned position.

In these hydraulic devices plates 133-137 are brazed together to form a single unitary structure.

In the hydraulic device of FIG. 31 the fluid ports, the recesses (P1, R1, P2, M1, C1, R2 and C2) and the respective fluid passages therebetween in the body 127 of the steering unit must be cast and/or machined. These are time and labor consuming manufacturing operations.

In the alternate device of FIG. 37 a series of plates 146 simplify the construction of the fluid passages in the device between the port openings and the recesses (P1, R1, P2, M1, C1, R2 and C2) in the housing 127a of the device; this in addition to the series of plates 147 that simplifies the construction of the fluid passages connecting the 130 recess, respectively, with the gerotor cells.

Each plate of the series of plates 146, 147 is designed for ease of individual manufacture (usually by stamping) and to reduce or to simplify the construction of the remainder of the device. (For example in the device disclosed the fluid passages 148 and 149 in the housing 127a are designed for construction in one perpendicular drilling operation from the flat face of the housing 127a.) The series of plates are then brazed together to form a single unitary structure.

The multi-plate construction of the gerotor porting, plates 147, and of the body of the steering unit, plates 146, greatly reduces the cost of construction while increasing the flexibility of power steering units.

FIGS. 42, 43 and 44 disclose an alternate hydrostatic steering device. This alternate device uses a heavy pin drive link 591 as the mechanical drive between the drive shaft and wobble stick. This alternate device also has a unitary valving slide member 492.

In this alternate device the drive shaft 535y has an inner end 593 of reduced diameter directly surrounding the compression springs 587y. A generally cylindrical drive member 594 is journaled upon the inner end of 593 of the drive shaft 535y. The compression springs 537y fit into two slots 595 that are milled into the inner diameter of the drive member 594. These springs serve as the torsion connection in the device.

One end of the drive member 494 extends beyond the drive shaft 535y. Two slots 596 are formed in this end of the drive member 594. A heavy pin or tooth (⅜ diameter) drive link 491 extends through the wobble stick 597 and these slots 596 forming a drive connection between them. At the other end of the drive member 594 two tangs 598 extend into two slots 599 in the drive shaft 435y forming a drive connection between them. (See FIG. 42) Slots 599 are oversized such that there is a lost-motion type connection between the drive shaft 535y and the drive member 594. At the end of the rotary motion allowed by this lost-motion type connection (15 either direction), the drive member 594 is a solid mechanical drive between the drive shaft 535y and the wobble stick 597. The slots ease assembly and repair of the device.

With modifications obvious to one skilled in the art, the relative positions of the drive shaft 535y and drive member 594 could be reversed with the drive member 594 journaled inside the drive shaft 535y.

A valving slide member 592 surrounds the drive member 594 and part of the drive shaft 535y. Slots 600 formed in one end of the valving slide member 592 accept the outer ends of the heavy pin drive link 591. At the other end of the valving slide member 592 a plurality of balls 541, carried in recesses 501 of the valving slide member 592, engage short helical grooves 542 in the drive shaft 535y. Together they transform oscillation of the drive shaft 535y into axial movement of the valving slide member 592.

Staging grooves S on the outer circumferential surface of the valving slide member 591 valve the device. These grooves are located at the neutral position of the device generally opposite to the fluid port openings. Any rotary motion of the valving slide member would move the staging grooves S in respect to their initial position to vary the point of least resistance, and the direction of fluid flow, of the device. This would help lubricate and cool the device in a manner.

FIGS. 45-50 disclose a third hydrostatic steering device incorporating the invention of this application. This hydrostatic steering device utilizes an "H" drive member as the drive connection between the wobble stick and the other parts of the device.

The valve actuation parts of the device include a wobble stick 632, the aforementioned "H" drive member 633, an actuation member 634, a sliding sleeve 635, a torsion member 636, an interconnection member 637 and a drive shaft 638.

The wobble stick 632 has a direct toothed connection with one end of the "H" drive member 633 for rotation therewith.

The other end of the "H" drive member 633 forms a lost-motion type drive connection with the drive shaft 638. See FIG. 47.

The sliding valve sleeve 635 surrounds the "H" drive member 633 and part of the drive shaft 638 with a slight clearance, preferably between about 0.002 and 0.020 inches therebetween (to allow for fluid passage).

An actuation member 634 extends between the "H" drive member 633 and the sliding sleeve valve 635 for translating any rotary motion of the sliding sleeve valve 635 into axial motion of the same piece. (Within limits to be later described).

The actuation member 634 includes two balls 639, a spring 640, a safety rod 641 and bushings 642. See FIG. 46. The balls 639 of the actuation member 634 engage diagonal grooves 643, in the sliding sleeve valve 635. The spring 640 tensions the balls 639 in these grooves 643. The safety rod 641 prevents the disengagement of the balls 639 from the grooves 643. The bushings 642 prevent any binding of the balls 639.

An interconnection member 537 extends between the drive shaft 538 and the sliding sleeve valve 535. Due to this connection any rotary motion of the drive shaft 538 rotates the sliding sleeve valve 535.

The interconnection member 537 includes two balls 544, a spring 545, a safety rod 546 and two bushings 547. See FIG. 47. The balls 644 engage straight grooves 648 in the sliding sleeve valve 635. The spring 645 tensions the balls 644 in these grooves 648. The safety rod 646 prevents the disengagement of the balls 644 from the grooves 648. The bushings 647 prevent any binding of the balls 644.

A torsion member 636 extends between the drive shaft 638 and the "H" drive member 633. This torsion member 636 serves as the torsion connection of the device.

The torsion member 636 includes two axially extending compression leaf springs 649 trapped between two flat plates 650. (The springs 649 are shown compressed in FIG. 48.) Leaf springs 649 are cut-out (see FIG. 45A) to reduce the initial torsion of the torsion member.

A lost-motion type interconnection exists between the drive shaft 638 and the "H" drive member 633. This lost-motion type interconnection limits the degree of rotary motion allowed by the device between the drive shaft 638 (and interconnected sleeve valve 635) and the "H" drive member 633.

FIG. 48 shows the third hydrostatic steering device of FIG. 45 in a full turning position.

FIG. 49 shows a modified third hydrostatic steering device. In this figure the compression leaf springs extend laterally of the device. See FIG. 48. This modification allows the hydrostatic steering device to be of more compact construction.

Although this invention has been described in its preferred form with a certain degree of particularity, it is understood that the present disclosure of the preferred form has been made only way of example and that numerous changes in the details of construction and the combination and arrangement of parts may be resorted to without departing from the spirit and the scope of the invention as hereinafter claimed.

What is claimed is:

1. In a hydrostatic steering device having a valve member rotatably circumferentially surrounding a shaft connected valve seat to form a valve for the device, the valve extending for a certain axial length of the device, fluid passageways in the device leading to the valve, the valve member having an outer surface, and the device also having a resilient connection between the rotary valve member and valve seat, the improvement of the resilient connection being located within the certain axial length of the valve of the device, and one fluid passageway surrounding and extending by itself through and about the outer surface of the valve member with the other fluid passageways leading otherwise to the valve.

2. In a hydrostatic steering device having a valve member rotatably circumferentially surrounding a shaft connected valve seat to form a valve for the device, the valve extending for a certain axial length of the device, and the device also having a resilient connection between the rotary valve member and valve seat, the improvement of the resilient connection being located within the certain axial length of the valve of the device, and said resilient connection including a heavy pin, means to connect said heavy pin to one of the valve member or valve seat for rotation therewith, and means to resiliently connect said heavy pin to the other of said valve member or valve seat.

3. The improved hydrostatic device of claim 2 wherein the device has fluid passageways and characterized in that said means to resiliently connect said heavy pin to the other of said valve member or valve seat includes a drive cavity and said drive cavity being one of the fluid passageways of the device.

4. The improved hydrostatic device of claim 2 wherein the device has a second shaft means having a longitudinal axis and characterized by the addition of a connecting pin, said connecting pin having two ends, one end of said connecting pin being located in one of the valve member or the second shaft means extending substantially parallel to the longitudinal axis of the second shaft means, a hole, said hole being located in the other of the valve member or the second shaft means and the other end of said connecting pin extending into said hole, said connecting pin rotatably connecting the valve member to the second shaft means.

5. The improved hydrostatic steering device of claim 4 wherein said connecting pin has a diameter and said hole has a width and a length, said length of said hole extending radially of the longitudinal axis of the second shaft and wherein said width of said hole is substantially equal to to said diameter of said connecting pin and said length of said hole being greater than said diameter of said connecting pin.

6. In a hydrostatic steering device having a valve member rotatably circumferentially surrounding a drive shaft connected valve seat to form a valve for the device, the valve extending for a certain axial length of the device, fluid passageways in the device leading to the valve, the valve member having an outer surface, and the device also having a resilient connection between the rotary valve member and valve seat, the improvement of the resilient connection being located within the certain axial length of the valve of the device, and one fluid passageway surrounding and extending by itself through and about the outer surface of the valve member with the other fluid passageways leading otherwise to the valve.

7. In a hydrostatic steering device having a valve member rotatably circumferentially surrounding a drive shaft connected valve seat to form a valve for the device, the valve extending for a certain axial length of the device, and the device also having a resilient connection between the rotary valve member and valve seat, the improvement of the resilient connection being located within the certain axial length of the valve of the device, said resilient connection including a heavy pin, means to connect said heavy pin to one of the valve member or valve seat for rotation therewith, and means to resiliently connect said heavy pin to the other of said valve member or valve seat.

8. The improved hydrostatic device of claim 7 wherein the device has fluid passageways and characterized in that said means to resiliently connect said heavy pin to the other of said valve member or valve seat includes a drive cavity and said drive cavity being one of the fluid passageways of the device.

9. The improved hydrostatic device of claim 7 wherein the device has a drive feedback means having a longitudinal axis and characterized by the addition of a connecting pin, said connecting pin having two ends, one end of said connecting pin being located in one of the valve member or the drive feedback means extending substantially parallel to the longitudinal axis of the drive feedback means, a hole, said hole being located in the other of the valve member or the drive feedback means and the other end of said connecting pin extending into said hole, said connecting pin rotatably connecting the valve member to the drive feedback means.

10. The improved hydrostatic steering device of claim 9 wherein said connecting pin has a diameter and said hoe has a width and a length, said length of said hole extending radially of the longitudinal axis of the drive feedback means and wherein said width of said hole is substantially equal to to said diameter of said connecting pin and said length of said hole being greater than said diameter of said connecting pin.

11. An improved hydrostatic steering device, said device comprising a drive shaft, a valve seat, means to rotatably connect said valve seat to said drive shaft, a valve member, said valve member surrounding part of said valve seat, said valve member having an outer surface, said valve seat and valve member forming a valve at their joint, passageway means to get fluid to said valve, passageway means to get fluid from said valve, means within the location where said valve member surrounds said valve seat to resiliently connect said valve member to said valve seat for a certain degree of rotation, drive-feedback means, means to rotatably connect said drive-feedback means to said valve member, means to lost-motion drivingly rotatably connect said drive-feedback means to said drive shaft after said certain degree of rotation, one of said passageway means to get fluid to said valve or said passageway means to get fluid from said valve surrounding and passing by itself through and about the outer surface of said valve member, and the other of said passageway means leading otherwise to the valve.

12. An improved hydrostatic steering device, said device comprising a drive shaft, a valve seat, means to rotatably connect said valve seat to said drive shaft, a valve member, said valve member surrounding part of said valve seat, said valve seat and valve member forming a valve at their joint, means to get fluid to said valve, means to get fluid from said valve, means within the location where said valve member surrounds said valve seat to resiliently connect said valve member to said valve seat for a certain degree of rotation, drive-feedback means, means to rotatably connect said drive-feedback means to said valve member, means to lost-motion drivingly rotatably connect said drive-feedback means to said drive shaft after said certain degree of rotation and wherein said means to resiliently connect said valve member to said valve seat further comprises a drive cavity, said drive cavity being in said valve member, a heavy pin, said heavy pin extending from said valve seat into aid drive cavity in said valve member and means to resiliently connect said heavy pin to said valve member.

13. The improved hydrostatic steering device of claim 12 wherein said valve member has an outer diameter and characterized in that said means to resiliently connect said heavy pin to said valve member comprises a "C" shaped torsion member, said "C" shaped torsion member having an opening, said "C" shaped torsion member surrounding the outer diameter of said valve member with said heavy pin extending into said opening, tab means extending off of said valve member and said tab means extending into said opening, the movement of said valve seat and said heavy pin in respect to said valve member expanding said opening in said "C" shaped torsion member against the resilient pressure thereof.

14. The improved hydrostatic steering device of claim 12 characterized in that said means to connect said drive feedback means to said valve member for rotation therewith comprises a connecting pin, said connecting pin being in one of said drive feedback means and said valve member, a hole, said hole being in the other of said drive feedback means and said valve member, and said connecting pin extending into said hole.

15. The improved hydrostatic steering device of claim 14 characterized in that said connecting pin has a width and a length, said hole has a width and a length, said length of said hole extending radially of said other of said drive feedback means, and said valve member, said width of said hole being substantially equal to said width of said connecting pin and said length of said hole being greater than said length of said connecting pin.

16. In a hydrostatic steering device having a valve with two axially spaced sides and a high pressure fluid connection to one axial side of the valve pressure imbalancing the valve, the improvement of the addition of equalization means on the other axial side of the valve to equalize the high pressure connection on the one axial side of the valve and pressure balance the valve, said equalization means including a seal means, said seal means located in the valve adjacent to the other axial side of the valve, said seal means having an axially inner side, and means to pressurize said inner side of said seal means to move said seal means axially outward in respect to the valve to equalize the high pressure connection on the one axial side of the valve.

17. The improved hydrostatic steering device of claim 16 where in the fluid connection to one axial side of the valve is a high pressure commutation feed groove on one axial side of the valve and said equalization means is a fluid area on the other axial side of the valve connected to high pressure.

18. The improved hydrostatic steering device of claim 16 wherein said equalization means is a groove on the other axial side of the valve connected to high pressure.

19. The improved hydrostatic steering device of claim 16 wherein there are two axially spaced sides and multiple high pressure fluid connections to the axial sides of the valve pressure imbalancing the valve, the improvement of the addition of multiple related equalization means on the other axial sides respectively of the valve to equalize the high pressure connection on the axial side respectively of the valve to pressure balance the valve.

* * * * *